US012153377B2

(12) United States Patent
Sakai et al.

(10) Patent No.: US 12,153,377 B2
(45) **Date of Patent: *Nov. 26, 2024**

(54) ELECTROSTATIC CHARGE IMAGE DEVELOPER, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Karin Sakai, Minamiashigara (JP); Kazutsuna Sasaki, Minamiashigara (JP); Yosuke Tsurumi, Minamiashigara (JP); Yasuo Kadokura, Minamiashigara (JP); Takuro Watanabe, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 527 days.

This patent is subject to a terminal disclaimer.

(21) Appl. No.: 17/399,174

(22) Filed: Aug. 11, 2021

(65) Prior Publication Data

US 2022/0373922 A1 Nov. 24, 2022

(30) Foreign Application Priority Data

May 20, 2021 (JP) ................................ 2021-085620

(51) Int. Cl.
*G03G 15/08* (2006.01)
*G03G 9/08* (2006.01)
(Continued)

(52) U.S. Cl.
CPC ......... *G03G 9/1139* (2013.01); *G03G 9/0819* (2013.01); *G03G 9/0821* (2013.01);
(Continued)

(58) Field of Classification Search
None
See application file for complete search history.

(56) References Cited

U.S. PATENT DOCUMENTS 5,663,027 A * 9/1997 Kohri ................. G03G 9/10884 430/111.4
6,214,510 B1 * 4/2001 Kojima ................ G03G 9/0819 399/308
(Continued)

FOREIGN PATENT DOCUMENTS

JP 2008-304745 A 12/2008
JP 2011-186005 A 9/2011
(Continued)

OTHER PUBLICATIONS

Aerosil TDS, Jul. 2004, http://www.usfiberglasssupply.com/uploads/8/1/9/0/81907428/tds.aerosil.pdf (Year: 2004).*
(Continued)

*Primary Examiner* — Peter L Vajda
*Assistant Examiner* — Charles Collins Sullivan, IV
(74) *Attorney, Agent, or Firm* — Oliff PLC

(57) ABSTRACT

An electrostatic charge image developer contains: a toner containing a toner particle and an external additive; and a carrier containing a magnetic particle and a resin layer covering the magnetic particle; and the toner particle has a surface property index value of 1.0 or more and less than 2.0; and the carrier has a surface having a ratio B/A of a surface area B to a plane view area A of 1.020 or more and 1.100 or less, the plane view area A and the surface area B being obtained by three-dimensional analysis of the surface of the carrier.

20 Claims, 2 Drawing Sheets

(51) Int. Cl.
*G03G 9/107* (2006.01)
*G03G 9/113* (2006.01)
*G03G 21/18* (2006.01)

(52) U.S. Cl.
CPC ........... *G03G 9/107* (2013.01); *G03G 9/1133* (2013.01); *G03G 15/08* (2013.01); *G03G 21/1814* (2013.01)

(56) References Cited

U.S. PATENT DOCUMENTS

| | | | | |
|---|---|---|---|---|
| 9,726,998 | B1 * | 8/2017 | Morooka | G03G 9/1139 |
| 2001/0046636 | A1 * | 11/2001 | Daimon | G03G 9/0821 430/137.14 |
| 2011/0217643 | A1 | 9/2011 | Ishizuka | |
| 2017/0184997 | A1 | 6/2017 | Tsurumi et al. | |
| 2017/0242354 | A1 | 8/2017 | Saito et al. | |
| 2018/0120724 | A1 | 5/2018 | Sakata et al. | |
| 2018/0143557 | A1 * | 5/2018 | Ueda | G03G 9/0821 |
| 2018/0364602 | A1 * | 12/2018 | Kadonome | G03G 9/08755 |
| 2019/0294062 | A1 | 9/2019 | Kadokura et al. | |
| 2021/0088924 | A1 | 3/2021 | Anno et al. | |

FOREIGN PATENT DOCUMENTS

| | | | |
|---|---|---|---|
| JP | 2016-212254 | A | 12/2016 |
| JP | 2019-056771 | A | 4/2019 |
| JP | 2019-168533 | A | 10/2019 |
| JP | 2019-168535 | A | 10/2019 |
| JP | 2021-051149 | A | 4/2021 |

OTHER PUBLICATIONS

Jul. 17, 2023 Office Action issued in European Patent Application No. 22165834.7.

Mar. 1, 2022 Search Report issued in European Patent Application No. 21195434.2.

Jan. 12, 2024 Office Action issued in European Patent Application No. 22165834.7.

Oct. 1, 2024 Office Action issued in Japanese Patent Application No. 2021-085620.

* cited by examiner

ELECTROSTATIC CHARGE IMAGE DEVELOPER, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2021-085620 filed on May 20, 2021.

BACKGROUND

1. Technical Field

The present disclosure relates to an electrostatic charge image developer, a process cartridge, an image forming apparatus, and an image forming method.

2. Related Art

JP-A-2019-168533 discloses an electrostatic charge image developing toner having a surface property index value of 2.0 or more to 2.8 or less.

JP-A-2011-186005 discloses an electrostatic charge image developing carrier including a carrier body having a core material and a coating resin layer, and spherical silica particles having a volume average particle diameter of 50 nm or more and 300 nm or less and adhering to a surface of the carrier body at a ratio of 0.001 parts by mass or more and 0.100 parts by mass or less with respect to 10 parts by mass of the carrier body.

JP-A-2008-304745 discloses an electrostatic charge image developer containing a carrier having a resin coating layer on a core material and a toner. The carrier contains 7 to 35 mass % of silica or carbon black in the resin coating layer. A weight average molecular weight of a resin to be coated is 300,000 to 600,000. The toner contains external additive fine particles having a number average particle diameter of 70 to 300 nm.

SUMMARY

Aspects of non-limiting embodiments of the present disclosure relate to an electrostatic charge image developer including a toner containing toner particles and an external additive, and a carrier having magnetic particles and a resin layer. The electrostatic charge image developer prevents occurrence of fogging as compared with an electrostatic charge image developer in which a surface property index value of the toner particles is 2.0 or more, or an electrostatic charge image developer in which a ratio B/A of a surface area B of the carrier to a planar view area A of the carrier which are obtained by three-dimensional analysis of a surface of the carrier is less than 1.020 or more than 1.100.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic charge image developer containing:

a toner containing a toner particle and an external additive; and a carrier containing a magnetic particle and a resin layer covering the magnetic particle, in which the toner particle has a surface property index value of 1.0 or more and less than 2.0; and the carrier has a surface having a ratio B/A of a surface area B to a plane view area A of 1.020 or more and 1.100 or less, the plane view area A and the surface area B being obtained by three-dimensional analysis of the surface of the carrier.

BRIEF DESCRIPTION OF THE DRAWINGS

Exemplary embodiment(s) of the present invention will be described in detail based on the following figures, wherein.

DETAILED DESCRIPTION

Figure 1:
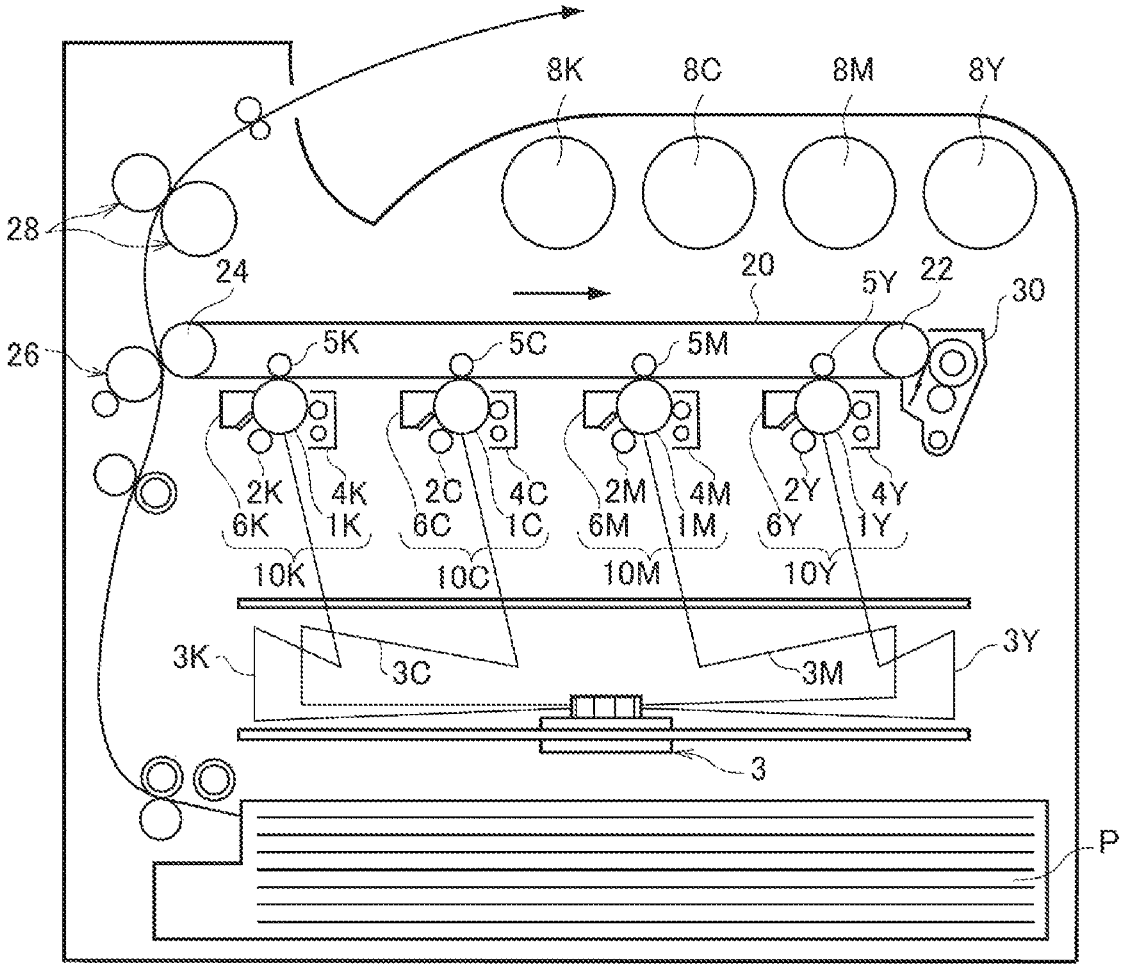
FIG. 1 is a schematic configuration diagram illustrating an example of an image forming apparatus according to the present exemplary embodiment.

Hereinafter, an exemplary embodiment according to the present disclosure will be described. These descriptions and Examples illustrate the exemplary embodiment, and do not limit the scope of the exemplary embodiment.

In the present disclosure, a numerical range indicated by "to" indicates a range including numerical values before and after "to" as a minimum value and a maximum value, respectively.

In numerical ranges described in stages in the present disclosure, an upper limit or a lower limit described in one numerical range may be replaced with an upper limit or a lower limit of a numerical range described in other stages. In the numerical ranges described in the present disclosure, the upper limit or the lower limit of the numerical range may be replaced with values illustrated in Examples.

In the present disclosure, the term "step" indicates not only an independent step, and even when a step cannot be clearly distinguished from other steps, this step is included in the term "step" as long as an intended purpose of the step is achieved.

When an exemplary embodiment is described in the present disclosure with reference to the drawings, a configuration of the exemplary embodiment is not limited to a configuration illustrated in the drawings. Sizes of members in each drawing are conceptual, and a relative size relation between the members is not limited thereto.

In the present disclosure, each component may include plural corresponding substances. In the present disclosure, in a case of referring to an amount of each component in a composition, when there are plural substances corresponding to each component in the composition, unless otherwise specified, the amount of each component in a composition refers to a total amount of the plural substances present in the composition.

In the present disclosure, plural kinds of particles corresponding to each component may be selected. When there are plural kinds of particles corresponding to each component in the composition, unless otherwise specified, a particle diameter of each component means a value for a mixture of the plural kinds of particles present in the composition.

In the present disclosure, the term "(meth)acryl" means at least one of acryl and methacryl, and the term "(meth) acrylate" means at least one of acrylate and methacrylate.

In the present disclosure, the term "electrostatic charge image developing toner" is also referred to as a "toner". The term "electrostatic charge image developing carrier" is also referred to as a "carrier". The term "electrostatic charge image developer" is also referred to as a "developer".

<Electrostatic Charge Image Developer>

A developer according to the present exemplary embodiment is a two-component developer including a toner and a carrier.

In the present exemplary embodiment, a mixing ratio (mass ratio) of the toner and the carrier is preferably toner:carrier=1:100 to 30:100, more preferably 3:100 to 20:100, and still more preferably 5:100 to 15:100.

The toner according to the present exemplary embodiment includes a toner particle and an external additive, and the surface property index value of the toner particle is 1.0 or more and less than 2.0.

In the present exemplary embodiment, the surface property index value of the toner particle is an index for evaluating ruggedness of a toner particle surface. As the surface property index value approaches 1.0, the toner particle surface tends to be smooth. As the surface property index value moves away from 1.0, the toner particle surface tends to be rough. The surface property index value of the toner particle is calculated from the following Equations 1 and 2.

Surface property index value of the toner particle=specific surface area measured value of the toner particle/specific surface area calculation value of the toner particle     Equation 1:

Specific surface area calculation value of the toner particle=sum of surface areas calculated from equivalent circle diameters of 4500 toner particles in flow particle image analysis/(density of the toner particle×sum of volumes calculated from equivalent circle diameters of the 4500 toner particles in flow particle image analysis)     Equation 2:

The specific surface area measured value of the toner particle is obtained from a nitrogen adsorption amount by BET one-point method (equilibrium relative pressure: 0.3).

A flow particle image analysis apparatus FPIA-3000 manufactured by Sysmex Corporation is used for the flow particle image analysis performed to determine the specific surface area calculation value of the toner particle. The FPIA-3000 captures the toner particle, performs two-dimensional image processing, and calculates the equivalent circle diameter from a projection area. Assuming that the toner particle is a true sphere, a surface area and a volume of the true sphere are calculated from the equivalent circle diameter. A sum of the surface areas and a sum of the volumes are calculated from equivalent circle diameters of 4,500 toner particles.

Density of the toner particle is measured by measuring true density in accordance with 8.2.2 of JIS K0061: 2001 using a Gulysack type specific gravity bottle.

The toner particle to be subjected to the measurement is the particle obtained by removing the external additive from the toner. Removal of the external additive from a surface of the toner is performed by repeating ultrasonic treatment in water containing a surfactant and washing with water.

The carrier in the present exemplary embodiment is a resin-coated carrier including magnetic particle and a resin layer covering the magnetic particle. In the carrier according to the present exemplary embodiment, a ratio B/A of the surface area B of the carrier to the planar view area A of the carrier is 1.020 or more and 1.100 or less. The planar view area A and the surface area B are obtained by three-dimensional analysis of the surface of the carrier.

In the present exemplary embodiment, the ratio B/A is an index for evaluating ruggedness of the carrier surface. The ratio B/A is determined by the following method.

As an apparatus for three-dimensional analysis of the carrier surface, a scanning electron microscope including four secondary electron detectors (for example, electron beam three-dimensional roughness analysis apparatus ERA-8900FE, manufactured by Elionix Inc.) is used, and analysis is performed as follows.

The surface of one carrier particle is enlarged 5,000 times. A distance between two measurement points is set to 0.06 μm. The measurement point is set to 400 points in a long side direction and 300 points in a short side direction. A region of 24 μm×18 μm is measured to obtain three-dimensional image data.

For the three-dimensional image data, a limit wavelength of a spline filter (a frequency selection filter using a spline function) is set to 12 μm to remove wavelengths having a period of 12 μm or more. Accordingly, a waviness component of the carrier surface is removed and a roughness component is extracted to obtain a roughness curve.

Furthermore, a cutoff value of a Gaussian high-pass filter (a frequency selection filter using a Gaussian function) is set to 2.0 μm to remove wavelengths having a period of 2.0 μm or more. Accordingly, wavelengths corresponding to convex portions of the magnetic particle exposed on the carrier surface are removed from the roughness curve after the spline filtering to obtain a roughness curve from which a wavelength component having a period of 2.0 μm or more is removed.

From three-dimensional roughness curve data after the filtering, the surface area B ($μm^2$) of a region, which is a central portion of 12 μm×12 μm, (the plan view area A=144 $μm^2$) is obtained, so as to obtain the ratio B/A. The ratio B/A is calculated for each of 100 carriers and arithmetically averaged.

The electrostatic charge image developer according to the present exemplary embodiment prevents occurrence of fogging. The "fogging" is a phenomenon in which toner scatters and an unintended minute dot-like image appears on an image forming surface of a recording medium. The following is presumed as a mechanism for preventing the occurrence of fogging in the present exemplary embodiment.

The toner is triboelectrically charged by being stirred together with the carrier in a developing device. When a charge amount of the toner is insufficient, the toner does not adhere to an image carrier during development and scatters. As a result, the fogging occurs. One of ways for preventing the occurrence of the fogging is to prevent toner aggregation in the developing device to allow the individual toner to be stirred and sufficiently triboelectrically charge the individual toner.

In the developer according to the present exemplary embodiment, the surface property index value of the toner particle is less than 2.0, and the ratio B/A of the carrier surface is 1.020 or more. That is, in the developer according to the present exemplary embodiment, a height difference of the ruggedness of a toner particle surface is relatively small, and the number of the ruggedness of the carrier surface is relatively large or the height difference of the ruggedness of the carrier surface is relatively large. When the developer according to the present exemplary embodiment having such surface characteristics is stirred in the developing device, it is presumed that a distribution of the external additive is less biased at the toner particle surface, and the external additive easily moves between the toner particle surface and the convex portion of the carrier surface. Accordingly, a sufficient amount of the external additive is uniformly distributed at the toner particle surface. Therefore, the toner aggregation is unlikely to occur in the developing device, and it is presumed that the individual toners are well stirred.

When the surface property index value of the toner particle is 2.0 or more, it is presumed that the height difference of the ruggedness of the toner particle surface is excessively large, the external additive is easily biased to the concave portion of the toner particle surface, and the amount of the external additive of the convex portion of the toner particle surface is reduced. Then, it is presumed that the toner is aggregated via the convex portion at the toner particle surface having a small amount of the external additive, the individual toners are not stirred, the toner having an insufficient charge amount is generated, and the fogging is generated.

When the ratio B/A of the carrier surface is less than 1.020, it is presumed that the carrier surface is excessively flat, a contact surface of the carrier with the toner becomes large, and as a result, a transfer amount of the external additive from the toner to the carrier becomes large. Then, it is presumed that the toner in which the amount of the external additive is reduced aggregates, the individual toners are not stirred, the toner having the insufficient charge amount is generated, and the fogging occurs.

On the other hand, when the ratio B/A of the carrier surface is more than 1.100, it is presumed that the number of ruggedness at the carrier surface is excessively large or the height difference of the ruggedness at the carrier surface is too large, the amount of the external additive entering the concave portion at the carrier surface increases, and the amount of the external additive returning from the carrier to the toner decreases. Then, it is presumed that the toner in which the amount of the external additive is reduced aggregates, the individual toners are not stirred, the toner having the insufficient charge amount is generated, and the fogging occurs.

From the viewpoint of preventing the above-described phenomenon, in the developer according to the present exemplary embodiment, the surface property index value of the toner particle is less than 2.0, and the ratio B/A of the carrier surface is 1.020 or more and 1.100 or less.

For the above reasons, the ratio B/A of the carrier surface is preferably 1.030 or more and 1.090 or less, more preferably 1.040 or more and 1.080 or less, and still more preferably 1.040 or more and 1.070 or less.

For the above reasons, the surface property index value of the toner particle is preferably 1.9 or less, more preferably 1.8 or less, and still more preferably 1.7 or less.

Since it is difficult to manufacture the toner particle having the surface property index value of less than 1.0, from a viewpoint of ease of manufacture, the surface property index value of the toner particle is 1.0 or more, preferably 1.1 or more, more preferably 1.2 or more, and still more preferably 1.3 or more.

The surface property index value of the toner particle can be controlled, for example, by adjusting a temperature or pH at the time of fusing and coalescing aggregated particles including the resin particles when the toner particle are produced by an aggregation and coalescence method.

The ratio B/A of the carrier surface can be controlled by manufacturing conditions for forming the resin layer. Details will be described later.

The toner and the carrier according to the present exemplary embodiment will be described in detail.

<Toner>

The toner preferably has a storage elastic modulus G' of $6.0\times10^8$ Pa or more and $1.5\times10^9$ Pa or less at a temperature of 30° C. in dynamic viscoelasticity measurement.

The storage elastic modulus G' means an elastic response component of an elastic modulus in a relationship a stress generated with respect to strain when deformed. The toner tends to be harder as a value of the storage elastic modulus G' is larger.

The temperature of 30° C. is a temperature at which phase separation between an amorphous polyester resin and a crystalline polyester resin is maintained when the crystalline polyester resin is used. The temperature at which the hardness of the toner is evaluated in the present exemplary embodiment is specified to be 30° C.

When the storage elastic modulus G' of the toner at the temperature of 30° C. is $6.0\times10^8$ Pa or more, the external additive is less likely to be embedded in the toner particle, and aggregation of the toner in which the external additive is reduced may be prevented. Therefore, the individual toners are not stirred, and toner having the insufficient charge amount is less likely to be generated, and the fogging is less likely to occur.

When the storage elastic modulus G' of the toner at the temperature of 30° C. is $1.5\times10^9$ Pa or less, the external additive is less likely to be detached from the toner particle and the external additive is held at the toner particle surface, so that the aggregation of the toner in which the external additive is reduced may be prevented. Therefore, the individual toners are not stirred, and toner having the insufficient charge amount is less likely to be generated, and the fogging is less likely to occur.

From the above viewpoint, the storage elastic modulus G' of the toner at the temperature of 30° C. is more preferably $7.0\times10^8$ Pa or more and $1.4\times10^9$ Pa or less, and still more preferably $8.0\times10^8$ Pa or more and $1.2\times10^9$ Pa or less.

The storage elastic modulus G' of the toner may be controlled by an amount ratio between the amorphous resin and the crystalline resin contained in the toner. The storage elastic modulus G' of the toner tends to decrease as the amount of the crystalline resin increases.

The storage elastic modulus G' of the toner is determined by performing the dynamic viscoelasticity measurement as follows.

Sample: Using a press molding machine, 0.25 g of toner is tablet-molded into a disk having a diameter of 8 mm and a thickness of 4 mm in an environment of 25° C.±3° C.

Measurement apparatus: Rheometer ARES, TA Instruments

Measurement jig: 8 mm parallel plate

Frequency: 1 Hz

Angular frequency: 6.28 rad/sec

Strain: 0.03% to 20% (automatic control)

Heat history: A sample is adhered to a parallel plate whose temperature is adjusted to 130° C., cooled to a temperature of 30° C. at a cooling rate of 1° C./min, held at a temperature of 30° C. for 30 minutes, and then measured at the temperature of 30° C.

[Toner Particle]

The toner particle contains, for example, a binder resin, and if necessary, a colorant, a mold releasing agent, and other additives.

—Binder Resin—

Examples of the binder resin include vinyl-based resins made of a homopolymer of monomers such as styrenes (such as styrene, parachlorostyrene, and α-methylstyrene), (meth)acrylates (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), and olefins (such as ethylene, propylene, and butadiene), or a copolymer obtained by combining two or more kinds of these monomers.

Examples of the binder resin include non-vinyl-based resins such as an epoxy resin, a polyester resin, a polyurethane resin, a polyamide resin, a cellulose resin, a polyether resin, and a modified resin, a mixture of the non-vinyl-based resin and the vinyl-based resin, or a graft polymer obtained by polymerizing a vinyl-based monomer in the presence of these non-vinyl-based resins.

These binder resins may be used alone or in combination of two or more kinds thereof.

The binder resin is suitably a polyester resin.

Examples of the polyester resin include a known amorphous polyester resin. As the polyester resin, the crystalline polyester resin may be used in combination with the amorphous polyester resin. However, the crystalline polyester resin may be used in a range in which a content thereof is 2 mass % or more and 40 mass % or less (preferably 2 mass % or more and 20 mass % or less) with respect to a total amount of the binder resin.

"Crystalline" of a resin means that the resin has a clear endothermic peak rather than a stepwise endothermic amount change in differential scanning calorimetry (DSC), and specifically means that a half width of the endothermic peak when measured at a heating rate of 10 (° C./min) is within 10° C.

On the other hand, "amorphous" of a resin means that a half width exceeds 10° C., a stepwise change in an endothermic amount is exhibited, or a clear endothermic peak is not observed.

Amorphous Polyester Resin

Examples of the amorphous polyester resin include a condensed polymer of polycarboxylic acid and polyhydric alcohol. As the amorphous polyester resin, a commercially available product may be used, or a synthetic resin may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower (for example, having 1 or more and 5 or less carbon atoms) alkyl esters thereof. Among these, the polycarboxylic acid is preferably, for example, an aromatic dicarboxylic acid.

As the polycarboxylic acid, a trivalent or higher carboxylic acid having a crosslinked structure or a branched structure may be used in combination with the dicarboxylic acid. Examples of the trivalent or higher carboxylic acid include trimellitic acid, pyromellitic acid, anhydrides thereof, and lower (for example, having 1 or more and 5 or less carbon atoms) alkyl esters thereof.

The polycarboxylic acid may be used alone or in combination of two or more kinds thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). Among these, the polyhydric alcohol is preferably, for example, an aromatic diol or an alicyclic diol, and more preferably an aromatic diol.

As the polyhydric alcohol, a trihydric or higher polyhydric alcohol having a crosslinked structure or a branched structure may be used in combination with the diol. Examples of the trihydric or higher polyhydric alcohol include glycerin, trimethylolpropane, and pentaerythritol.

The polyhydric alcohol may be used alone or in combination of two or more kinds thereof.

A glass transition temperature (Tg) of the amorphous polyester resin is preferably 50° C. or higher and 80° C. or lower, and more preferably 50° C. or higher and 65° C. or lower.

The glass transition temperature is obtained from a DSC curve obtained by the differential scanning calorimetry (DSC), and is more specifically obtained by an "extrapolated glass transition onset temperature" described in a method for obtaining the glass transition temperature of JIS K 7121: 1987 "Method for measuring transition temperature of plastics".

A weight average molecular weight (Mw) of the amorphous polyester resin is preferably 5,000 or more and 1,000,000 or less, and more preferably 7,000 or more and 500,000 or less.

A number average molecular weight (Mn) of the amorphous polyester resin is preferably 2,000 or more and 100,000 or less.

A molecular weight distribution Mw/Mn of the amorphous polyester resin is preferably 1.5 or more and 100 or less, and more preferably 2 or more and 60 or less.

The weight average molecular weight and the number average molecular weight are measured by gel permeation chromatography (GPC). Molecular weight measurement by GPC is performed by using a GPC•HLC-8120GPC manufactured by Tosoh Corporation as a measurement apparatus, using a column TSKgel SuperHM-M (15 cm) manufactured by Tosoh Corporation, and using a THF solvent. The weight average molecular weight and the number average molecular weight are calculated from measurement results using a molecular weight calibration curve prepared using a monodispersed polystyrene standard sample.

The amorphous polyester resin is obtained by a known production method. Specifically, for example, the amorphous polyester resin is obtained by a method in which a polymerization temperature is set to 180° C. or higher and 230° C. or lower, the pressure inside a reaction system is reduced as necessary, and reaction is performed while removing water or alcohols generated during condensation.

When a raw material monomer is not dissolved or compatible at a reaction temperature, a solvent having a high boiling point may be added as a dissolution aid to dissolve the monomer. In this case, a polycondensation reaction is carried out while distilling off the dissolution aid. When there is a monomer having poor compatibility in a copolymerization reaction, the monomer having the poor compatibility may be previously condensed with an acid or alcohol to be polycondensed with the monomer, and then the obtained product may be polycondensed with a main component.

Crystalline Polyester Resin

Examples of the crystalline polyester resin include a polycondensate of a polycarboxylic acid and a polyhydric alcohol. As the crystalline polyester resin, a commercially available product may be used, or a synthetic resin may be used.

Here, in order to easily form a crystal structure, the crystalline polyester resin is preferably a polycondensate using a linear aliphatic polymerizable monomer rather than a polymerizable monomer having an aromatic ring.

Examples of the polycarboxylic acid include aliphatic dicarboxylic acids (such as oxalic acid, succinic acid, glutaric acid, adipic acid, suberic acid, azelaic acid, sebacic acid, 1,9-nonandicarboxylic acid, 1,10-decandicarboxylic acid, 1,12-dodecanediocarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides thereof, and lower (for example, having 1 or more and 5 or less carbon atoms) alkyl esters thereof.

As the polycarboxylic acid, a trivalent or higher carboxylic acid having a crosslinked structure or a branched structure may be used in combination with the dicarboxylic acid. Examples of the trivalent carboxylic acid include aromatic carboxylic acids (such as 1,2,3-benzenetricarboxylic acid, 1,2,4-benzenetricarboxylic acid, and 1,2,4-naphthalenetricarboxylic acid), anhydrides thereof, and lower (for example, having 1 or more and 5 or less carbon atoms) alkyl esters thereof.

As the polycarboxylic acid, a dicarboxylic acid having a sulfonic acid group and a dicarboxylic acid having an ethylenic double bond may be used in combination with these dicarboxylic acids.

The polycarboxylic acid may be used alone or in combination of two or more kinds thereof.

Examples of the polyhydric alcohol include aliphatic diols (such as linear aliphatic diols having 7 or more and 20 or less carbon atoms in the main chain part). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecandiol, 1,14-tetradecanediol, 1,18-octadecanediol, and 1,20-eicosanediol. Among these, the aliphatic diol is preferably 1,8-octanediol, 1,9-nonanediol, or 1,10-decanediol.

As the polyhydric alcohol, a trihydric or higher alcohol having a crosslinked structure or a branched structure may be used in combination with the diol. Examples of the trihydric or higher alcohol include glycerin, trimethylolethane, trimethylolpropane, and pentaerythritol.

The polyhydric alcohol may be used alone or in combination of two or more kinds thereof.

Here, the polyhydric alcohol preferably has an aliphatic diol content of 80 mol % or more, and preferably 90 mol % or more.

A melting temperature of the crystalline polyester resin is preferably 50° C. or higher and 100° C. or lower, more preferably 55° C. or higher and 90° C. or lower, and still more preferably 60° C. or higher and 85° C. or lower.

The melting temperature is obtained from a DSC curve obtained by the differential scanning calorimetry (DSC) according to the "melting peak temperature" described in a method for obtaining the melting temperature of JIS K7121: 1987 "Method for measuring transition temperature of plastics".

A weight average molecular weight (Mw) of the crystalline polyester resin is preferably 6,000 or more and 35,000 or less.

The crystalline polyester resin can be obtained by, for example, a known production method same as the amorphous polyester resin.

A content of the binder resin is preferably 40 mass % or more and 95 mass % or less, more preferably 50 mass % or more and 90 mass % or less, and still more preferably 60 mass % or more and 85 mass % or less with respect to a total amount of the toner particle.

—Colorant—

Examples of the colorant include pigments such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorant may be used alone or in combination of two or more kinds thereof.

As the colorant, a surface-treated colorant may be used as necessary, or the colorant may be used in combination with a dispersant. Plural kinds of colorants may be used in combination.

A content of the colorant is preferably 1 mass % or more and 30 mass % or less, and more preferably 3 mass % or more and 15 mass % or less, with respect to the total amount of the toner particle.

—Mold Releasing Agent—

Examples of the mold releasing agent include hydrocarbon wax, natural wax such as carnauba wax, rice wax, and candelilla wax, synthetic or mineral/petroleum wax such as montan wax, and ester wax such as fatty acid ester and montanic acid ester. The mold releasing agent is not limited thereto.

The melting temperature of the mold releasing agent is preferably 50° C. or higher and 110° C. or lower, and more preferably 60° C. or higher and 100° C. or lower.

The melting temperature is obtained from a DSC curve obtained by the differential scanning calorimetry (DSC) according to the "melting peak temperature" described in a method for obtaining the melting temperature of JIS K7121: 1987 "Method for measuring transition temperature of plastics".

A content of the mold releasing agent is preferably 1 mass % or more and 20 mass % or less, and more preferably 5 mass % or more and 15 mass % or less, with respect to the total amount of the toner particle.

—Other Additives—

Examples of the other additives include known additives such as a magnetic body, an electrostatic charge control agent, and an inorganic powder. These additives are contained in the toner particle as internal additives.

—Properties of Toner Particle—

The toner particle may be toner particle having a single layer structure, or may be toner particle having a so-called core-shell structure made of a core portion (core particles) and a coating layer (shell layer) coating the core portion.

The toner particle having a core-shell structure may be made of, for example, a core portion made of a binder resin and, if necessary, other additives such as a colorant and a mold releasing agent, and a coating layer made of a binder resin.

A volume average particle diameter (D50v) of the toner particle is preferably 2 μm or more and 10 μm or less, and more preferably 4 μm or more and 8 μm or less.

The volume average particle diameter (D50v) of the toner particle is measured using Coulter Multisizer II (manufactured by Beckman Coulter, Inc.) and the electrolytic solution is ISOTON-II (manufactured by Beckman Coulter, Inc.).

During measurement, 0.5 mg or more and 50 mg or less of a measurement sample is added to 2 ml of a 5 mass % aqueous solution of a surfactant (preferably sodium alkylbenzene sulfonate) as the dispersant. The obtained mixture is added to 100 ml or more and 150 ml or less of the electrolytic solution.

The electrolytic solution in which the sample is suspended is subjected to a dispersion treatment for 1 minute with an ultrasonic disperser, and the Coulter Multisizer II is used to measure a particle size distribution of particles having a particle diameter within the range of 2 μm or more and 60 μm or less using an aperture having an aperture diameter of 100 μm. The number of the particles sampled is 50,000. A divided particle size range (channel) is set and a volume-based particle size distribution is obtained. Then, a cumulative distribution is drawn from a small particle diameter side and a particle diameter corresponding to the cumulative percentage of 50% with respect to all the particles is the volume average particle diameter D50v.

An average circularity of the toner particle is preferably 0.94 or more and 1.00 or less, and more preferably 0.95 or more and 0.98 or less.

The average circularity of the toner particle is obtained by (circle equivalent perimeter)/(perimeter) [(perimeter of a circle having the same projection area as a particle image)/(perimeter of the projected particle image)]. Specifically, the average circularity is a value measured by the following method.

First, the toner particles to be measured are sucked and collected to form a flat flow, and flash light is emitted instantly to capture a particle image as a still image. The average circularity is obtained by the flow-type particle image analysis apparatus (FPIA-3000 manufactured by Sysmex Corporation) that analyzes the particle image. The number of samples for obtaining the average circularity is 4,500.

When the toner contains the external additive, the toner to be measured is dispersed in water containing the surfactant, and then an ultrasonic treatment is performed to obtain toner particle from which the external additive is removed.

[External Additive]

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO{\cdot}SiO_2$, $K_2O{\cdot}(TiO_2)_n$, $Al_2O_3{\cdot}2SiO_2$, $CaCO_3$, $MgCO_3$, $BaSO_4$, and $MgSO_4$.

The surfaces of the inorganic particles as the external additive are preferably subjected to a hydrophobic treatment. The hydrophobic treatment is performed by, for example, immersing the inorganic particles in a hydrophobic treatment agent. The hydrophobic treatment agent is not particularly limited. Examples thereof include a silane coupling agent, a silicone oil, a titanate coupling agent, and an aluminum coupling agent. The hydrophobic treatment agent may be used alone or in combination of two or more kinds thereof.

An amount of the hydrophobic treatment agent is generally, for example, 1 part by mass or more and 10 parts by mass or less with respect to 100 parts by mass of the inorganic particles.

Examples of the external additive also include resin particles (resin particles such as polystyrene, polymethylmethacrylate, and melamine resin), and cleaning activators (for example, metal salts of higher fatty acids represented by zinc stearate, and particles of a fluoropolymer).

An amount of the external additive externally added is, for example, preferably 0.01 mass % or more and 5 mass % or less, and more preferably 0.01 mass % or more and 2.0 mass % or less, with respect to the toner particle.

[Method for Producing Toner]

The toner is obtained by preparing toner particle and then externally adding an external additive to the toner particle.

The toner particles may be produced by either a dry production method (for example, a kneading pulverization method) or a wet production method (for example, an aggregation and coalescence method, a suspension polymerization method, and a dissolution suspension method). These production methods are not particularly limited, and known production methods are adopted. Among these, it is preferable to obtain the toner particles by the aggregation and coalescence method.

Specifically, for example, when the toner particles are produced by an aggregation and coalescence method, the toner particles are produced through a step of preparing a resin particle dispersion liquid in which resin particles to be a binder resin are dispersed (resin particle dispersion liquid preparation step), a step of aggregating the resin particles (other particles if necessary) in the resin particle dispersion liquid (in a dispersion liquid after mixing with another particle dispersion liquid if necessary) to form aggregated particles (aggregated particle forming step), and a step of heating an aggregated particle dispersion liquid in which the aggregated particles are dispersed and fusing and coalescing the aggregated particles to form the toner particles (fusion and coalescence step).

Details of each step will be described below.

In the following description, a method for obtaining toner particles containing a colorant and a mold releasing agent will be described, but the colorant and the mold releasing agent are used as necessary. Of course, other additives other than the colorant and the mold releasing agent may be used.

—Resin Particle Dispersion Liquid Preparation Step—

Along with the resin particle dispersion liquid in which the resin particles to be the binder resin are dispersed, for example, a colorant particle dispersion liquid in which colorant particles are dispersed and a mold releasing agent particle dispersion liquid in which mold releasing agent particles are dispersed are prepared.

The resin particle dispersion liquid is prepared by, for example, dispersing the resin particles in a dispersion medium with a surfactant.

Examples of the dispersion medium used in the resin particle dispersion liquid include an aqueous medium.

Examples of the aqueous medium include water such as distilled water and ion-exchanged water, and alcohols. These media may be used alone or in combination of two or more kinds thereof.

Examples of the surfactant include a sulfate-based, sulfonate-based, phosphate-based, soap-based or other anionic surfactant, an amine salt type or quaternary ammonium salt type cationic surfactant, and a polyethylene glycol-based, alkylphenol ethylene oxide adduct-based, or polyhydric alcohol-based nonionic surfactant. Among these, the anionic surfactant and the cationic surfactant are particularly mentioned. The nonionic surfactant may be used in combination with the anionic surfactant or the cationic surfactant.

The surfactant may be used alone or in combination of two or more kinds thereof.

Examples of a method for dispersing the resin particles in the dispersion medium in the resin particle dispersion liquid include general dispersion methods such as a rotary shear homogenizer, a ball mill having a medium, a sand mill, and a dyno mill. Depending on a kind of the resin particles, the resin particles may be dispersed in the dispersion medium by a phase inversion emulsification method. In the phase inversion emulsification method, a resin to be dispersed is dissolved in a hydrophobic organic solvent in which the resin is soluble, and a base is added to an organic continuous phase (O phase) to neutralize the resin, and then an aqueous medium (W phase) is charged to perform phase inversion from W/O to O/W, and the resin is dispersed in the aqueous medium in the form of particles.

A volume average particle diameter of the resin particles dispersed in the resin particle dispersion liquid is, for example, preferably 0.01 μm or more and 1 μm or less, more preferably 0.08 μm or more and 0.8 μm or less, and still more preferably 0.1 μm or more and 0.6 μm or less.

The volume average particle diameter D50v of the resin particles is calculated measured by the volume-based particle size distribution obtained by measurement with a laser diffraction type particle size distribution measuring device (for example, LA-700 manufactured by HORIBA, Ltd.). A divided particle size range is set and the volume-based particle size distribution is obtained. Then, a cumulative distribution is drawn from a small particle diameter side and as a volume average particle diameter D50v, which is a particle diameter corresponding to the cumulative percentage of 50% with respect to all the particles is the volume average particle diameter D50v. The volume average particle diameters of the particles in other dispersion liquid are measured in the same manner.

A content of the resin particles contained in the resin particle dispersion liquid is preferably 5 mass % or more and 50 mass % or less, and more preferably 10 mass % or more and 40 mass % or less.

Similar to the resin particle dispersion liquid, for example, the colorant particle dispersion liquid and the mold releasing agent particle dispersion liquid are also prepared. That is, the volume average particle diameter, dispersion medium, dispersion method, and content of particles of the particles in the resin particle dispersion liquid are the same for the colorant particles dispersed in the colorant particle dispersion liquid and the mold releasing agent particles dispersed in the mold releasing agent particle dispersion liquid.

—Aggregated Particle Forming Step—

Next, the resin particle dispersion liquid, the colorant particle dispersion liquid, and the mold releasing agent particle dispersion liquid are mixed. Then, the aggregated particles containing the resin particles, the colorant particles, and the mold releasing agent particles having a diameter close to the diameter of the target toner particle is formed by hetero-aggregating the resin particles, the colorant particles, and the release agent particles in the mixed dispersion liquid.

Specifically, for example, the aggregated particles are formed by adding an aggregating agent to the mixed dispersion liquid, adjusting the pH of the mixed dispersion liquid to acidic (for example, a pH of 2 or more and 5 or less), adding a dispersion stabilizer as necessary, then heating the mixed dispersion liquid to a temperature close to the glass transition temperature (specifically, for example, the glass transition temperature of the resin particles −30° C. or higher and the glass transition temperature −10° C. or lower) of the resin particles, and aggregating the particles dispersed in the mixed dispersion liquid.

In the aggregated particle forming step, for example, the aggregating agent may be added at room temperature (for example, 25° C.) while stirring the mixed dispersion liquid with a rotary shearing homogenizer, the pH of the mixed dispersion may be adjusted to be acidic (for example, pH 2 or more and 5 or less), a dispersion stabilizer may be added as necessary, and then heating may be performed.

Examples of the aggregating agent include a surfactant having a polarity opposite to that of the surfactant contained in the mixed dispersion liquid, an inorganic metal salt, and a divalent or higher metal complex. When the metal complex is used as the aggregating agent, an amount of the surfactant used is reduced and chargeability is improved.

If necessary, an additive that forms a complex or a similar bond with metal ions of the aggregating agent may be used together with the aggregating agent. The additive is preferably a chelating agent.

Examples of the inorganic metal salt include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

As the chelating agent, a water-soluble chelating agent may be used. Examples of the chelating agent include oxycarboxylic acids such as tartaric acid, citric acid, and gluconic acid, and aminocarboxylic acids such as iminodiacetic acid (IDA), nitrilotriacetic acid (NTA), and ethylenediaminetetraacetic acid (EDTA).

An addition amount of the chelating agent is preferably 0.01 parts by mass or more and 5.0 parts by mass or less, and more preferably 0.1 parts by mass or more and less than 3.0 parts by mass, with respect to 100 parts by mass of the resin particles.

—Fusion and Coalescence Step—

Next, the aggregated particle dispersion liquid in which the aggregated particles are dispersed is heated to, for example, a temperature equal to or higher than the glass transition temperature of the resin particles (for example, a temperature higher than the glass transition temperature of the resin particles by 10° C. to 30° C.), so that the aggregated particles are fused and coalesced to form the toner particles.

The toner particles are obtained through the above steps.

The toner particles may be produced through a step of obtaining the aggregated particle dispersion liquid in which the aggregated particles are dispersed, then further mixing the aggregated particle dispersion liquid and the resin particle dispersion liquid in which the resin particles are dispersed, and performing aggregation to further adhere and aggregate the resin particles to surfaces of the aggregated particles to form second aggregated particles, and a step of heating a second agglomerated particle dispersion liquid in which the second aggregated particles are dispersed to fuse and coalesce the second aggregated particles to form the toner particles having a core-shell structure.

After the fusion and coalescence step is completed, the toner particles formed in the solution are subjected to a washing step, a solid-liquid separation step, and a drying step, which are known, to obtain dried toner particles. In the washing step, from the viewpoint of chargeability, displacement washing with ion-exchanged water may be sufficiently performed. In the solid-liquid separation step, from the viewpoint of productivity, suction filtration, pressure filtration, and the like may be performed. In the drying step, from the viewpoint of productivity, freeze-drying, air-flow drying, fluid-drying, vibration-type fluid-drying, and the like may be performed.

The toner is produced by adding the external additive to the toner particles in a dry state and mixing the materials. The mixing may be carried out by, for example, a V blender, a Henschel mixer, a Loedige mixer, or the like. Further, if necessary, coarse particles in the toner may be removed by using a vibration sieving machine, a wind sieving machine, or the like.

<Carrier>

The carrier in the present exemplary embodiment includes magnetic particle and a resin layer covering the magnetic particle.

[Magnetic Particle]

The magnetic particle is not particularly limited, and known magnetic particle used as a core material of the carrier are applied. Specific examples of the magnetic particle includes: a particle of a magnetic metal such as iron, nickel, and cobalt; a particle of a magnetic oxide such as ferrite and magnetite; a resin-impregnated magnetic particle obtained by impregnating a porous magnetic powder with a resin; and a magnetic powder-dispersed resin particle in which a magnetic powder is dispersed and blended in a resin. A ferrite particle is preferred as the magnetic particle in the present exemplary embodiment.

A volume average particle diameter of the magnetic particle is preferably 15 μm or more and 100 μm or less, more preferably 20 μm or more and 80 μm or less, and still more preferably 30 μm or more and 60 μm or less.

Here, the volume average particle diameter means a particle diameter D50v corresponding to the cumulative percentage of 50% in a volume-based particle size distribution from the side of the small diameter.

The arithmetic average height Ra (JIS B0601: 2001) of the roughness curve of the magnetic particle is obtained by observing the magnetic particle at an appropriate magnification (for example, a magnification of 1000 times) using a surface shape measurement apparatus (for example, "Ultra Depth Color 3D shape measurement microscope VK-9700" manufactured by KEYENCE CORPORATION), obtaining a roughness curve at a cutoff value of 0.08 mm, and extracting a reference length of 10 μm from the roughness curve in a direction of an average line thereof. The arithmetic average value of Ra of 100 magnetic particles is preferably 0.1 μm or more and 1 μm or less, and more preferably 0.2 μm or more and 0.8 μm or less.

As for a magnetic force of the magnetic particle, saturation magnetization in a magnetic field of 3,000 Oersted is preferably 50 emu/g or more, and more preferably 60 emu/g or more. The saturation magnetization is measured using a vibration sample type magnetic measurement apparatus VSMP10-15 (manufactured by Toei Industry Co., Ltd.). A measurement sample is packed in a cell having an inner diameter of 7 mm and a height of 5 mm and set in the apparatus. The measurement is performed by applying an applied magnetic field and sweeping up to 3000 Oersted. Next, the applied magnetic field is reduced to create a hysteresis curve on recording paper. The saturation magnetization, residual magnetization, and a holding force are obtained from data of the curve.

A volume resistivity of the magnetic particle is preferably $1\times10^5$ Ω·cm or more and $1\times10^9$ Ω·cm or less, and more preferably $1\times10^7$ Ω·cm or more and $1\times10^9$ Ω·cm or less.

The volume resistivity (Ω·cm) of the magnetic particle is measured as follows. A layer is formed by flatly placing an object to be measured on a surface of a circular jig on which a 20 $cm^2$ electrode plate is arranged so as to have a thickness of 1 mm or more and 3 mm or less. Another 20 $cm^2$ electrode plate is placed thereon to sandwich the layer. In order to eliminate voids between the object to be measured, the thickness (cm) of the layer is measured after applying a load of 4 kg on the electrode plate arranged on the layer. Both electrodes above and below the layer are connected to an electrometer and a high voltage power generator. A high voltage is applied to both electrodes so that an electric field is 103.8 V/cm, and a current value (A) flowing at this time is read. A measurement environment is under a temperature of 20° C. and a relative humidity of 50%. An equation for calculating the volume resistivity Ω·cm) of the object to be measured is as illustrated in the equation below.

$$R=E\times20/(I-I_0)/L$$

In the above equation, R represents the volume resistivity (Ω·cm) of the object to be measured, E represents the applied voltage (V), I represents the current value (A), $I_0$ represents a current value (A) under an applied voltage of 0 V, and L represents the thickness (cm) of the layer. The coefficient 20 represents the area ($cm^2$) of the electrode plate.

[Resin Layer]

Examples of a resin constituting the resin layer include: a styrene-acrylic acid copolymer; polyolefin-based resins such as polyethylene and polypropylene; polyvinyl-based or polyvinylidene-based resins such as polystyrene, an acrylic resin, polyacrylonitrile, polyvinyl acetate, polyvinyl alcohol, polyvinyl butyral, polyvinyl chloride, polyvinylcarbazole, polyvinyl ether, and polyvinylketone; a vinyl chloride-vinyl acetate copolymer; straight silicone resins consisting of an organosiloxane bond or a modified product thereof; fluororesins such as polytetrafluoroethylene, polyvinyl fluoride, polyvinylidene fluoride, and polychlorotrifluoroethylene; polyester, polyurethane; polycarbonate; amino resins such as urea and formaldehyde resins; and epoxy resins.

The resin layer preferably contains an acrylic resin having an alicyclic. A polymerization component of the acrylic resin having the alicyclic is preferably a lower alkyl ester of (meth)acrylic acid (for example, (meth)acrylic acid alkyl ester having an alkyl group having 1 or more and 9 or less carbon atoms), and specific examples thereof include methyl (meth)acrylate, ethyl (meth)acrylate, propyl (meth)acrylate, butyl (meth)acrylate, hexyl (meth)acrylate, cyclohexyl (meth)acrylate, and 2-ethylhexyl (meth)acrylate. These monomers may be used alone or in combination of two or more kinds thereof.

The acrylic resin having the alicyclic preferably contains cyclohexyl (meth)acrylate as the polymerization component. A content of a monomer unit derived from the cyclohexyl (meth)acrylate contained in the acrylic resin having the alicyclic is preferably 75 mass % or more and 100 mass % or less, more preferably 85 mass % or more and 100 mass % or less, and still more preferably 95 mass % or more and 100 mass % or less, with respect to a total mass of the acrylic resin having the alicyclic.

The weight average molecular weight of the resin contained in the resin layer is preferably less than 300,000. When the weight average molecular weight of the resin contained in the resin layer is less than 300,000, a strength of the resin layer is higher than that when the weight average molecular weight of the resin is 300,000 or more, and the resin layer is less likely to be peeled off when image formation is repeated. As a result, it is presumed that the stirring of the toner in the developing device is improved, the toner is sufficiently triboelectrically charged, and the occurrence of fogging is prevented.

From a viewpoint of increasing the strength of the resin layer and preventing the resin layer from peeling off, the weight average molecular weight of the resin contained in the resin layer is preferably 50,000 or more and less than 300,000, more preferably 100,000 or more and 250,000 or less, and still more preferably 100,000 or more and 200,000 or less.

From the viewpoint described above, the weight average molecular weight of the acrylic resin having the alicyclic contained in the resin layer is preferably 50,000 or more and less than 300,000, more preferably 100,000 or more and 250,000 or less, and still more preferably 100,000 or more and 200,000 or less.

When the resin layer contains plural kinds of resins, the weight average molecular weight of the resin contained in the resin layer is a weighted average obtained by weighting the weight average molecular weight of each resin by a content ratio (on a mass basis) of each resin.

The weight average molecular weight of the resin contained in the resin layer is measured by gel permeation chromatography (GPC). In the molecular weight measurement by the GPC, GPC•HLC-8120GPC manufactured by Tosoh Corporation is used as a measurement apparatus, column TSKgel Super HM-M (15 cm) manufactured by Tosoh Corporation is used, and tetrahydrofuran is used as a solvent. The weight average molecular weight is calculated from a measurement result using a molecular weight calibration curve prepared using a monodispersed polystyrene standard sample.

The resin layer preferably contains inorganic particles. In the present exemplary embodiment, the carbon black is not treated as an inorganic particle in the resin layer of the carrier.

When the inorganic particles are contained in the resin layer, a form in which fine ruggedness is appropriately present in the carrier surface is formed. Most of the ruggedness are covered with the resin, but some inorganic particles may be exposed. Since the exposed inorganic particles are not charged by contact with the toner unlike the resin, excessive charging of the carrier surface may be reduced. Further, when the resin layer of the carrier is abraded by repeating the image formation, the ruggedness is selectively abraded, and a part of the inorganic particles in the resin layer is newly exposed. When a part of the inorganic particles continues to be appropriately exposed at the carrier surface, the chargeability of the carrier surface is lowered, and an increase in the toner charging is prevented. As a result, transferability of a toner image is likely to be satisfactorily maintained.

Examples of the inorganic particles contained in the resin layer include metal oxide particles such as silica, titanium oxide, zinc oxide, and tin oxide, metal compound particles such as barium sulfate, aluminum borate, and potassium titanate, and metal particles such as gold, silver, and copper. Among these, the silica particles are preferable.

Surfaces of the inorganic particles may be subjected to the hydrophobic treatment. Examples of the hydrophobic treatment agent include known organic silicon compounds having an alkyl group (for example, a methyl group, an ethyl group, a propyl group, and a butyl group), and specific examples thereof include an alkoxysilane compound, a siloxane compound, and a silazane compound. Among these, the hydrophobic treatment agent is preferably a silazane compound, and preferably hexamethyldisilazane. The hydrophobic treatment agent may be used alone or in combination of two or more kinds thereof.

Examples of a method for hydrophobizing the inorganic particles with the hydrophobic treatment agent include a method in which supercritical carbon dioxide is used and the hydrophobic treatment agent is dissolved in the supercritical carbon dioxide to be attached to the surfaces of the inorganic particles, a method in which a solution containing a hydrophobic treatment agent and a solvent for dissolving the hydrophobic treatment agent is applied (for example, sprayed or coated) to the surfaces of the inorganic particles in the atmosphere to attach the hydrophobic treatment agent to the surfaces of the inorganic particles, and a method in which a solution containing a hydrophobic treatment agent and a solvent for dissolving the hydrophobic treatment agent is added to and held in an inorganic particle dispersion liquid in the air, and then a mixed solution of the inorganic particle dispersion liquid and the solution is dried.

An average particle diameter of the inorganic particles contained in the resin layer is preferably 5 nm or more and 90 nm or less. When the average particle diameter of the inorganic particles in the resin layer is 5 nm or more, a filler effect to increase the strength of the resin layer is easily obtained, and the resin layer is less likely to be peeled off when the image formation is repeated. When the average particle diameter of the inorganic particles in the resin layer is 90 nm or less, the inorganic particles are less likely to be detached from the convex portion of the resin layer, and the resin layer is less likely to be peeled off when the image formation is repeated. In either case, as a result, it is presumed that the stirring of the toner in the developing device is improved, the toner is sufficiently triboelectrically charged, and the occurrence of fogging is prevented.

From the viewpoint described above, the average particle diameter of the inorganic particles in the resin layer is more preferably 5 nm or more and 70 or less, still more preferably 5 nm or more and 50 nm or less, and yet still more preferably 8 nm or more and 50 nm or less.

The average particle diameter of the inorganic particles contained in the resin layer can be controlled by a size of the inorganic particles used for forming the resin layer.

An average thickness of the resin layer is preferably 0.6 μm or more and 1.4 μm or less.

When the average thickness of the resin layer is 0.6 μm or more, the resin layer is less likely to be peeled off when the image formation is repeated. When the average thickness of the resin layer is 1.4 μm or less, the toner external additive is less likely to adhere to or be embedded in the resin layer after the toner external additive is transferred to the resin layer, and the transfer amount of the external additive from the toner to the carrier does not become excessive. In either case, as a result, it is presumed that the stirring of the toner in the developing device is improved, the toner is sufficiently triboelectrically charged, and the occurrence of fogging is prevented.

From the viewpoint described above, the average thickness of the resin layer is more preferably 0.8 μm or more and 1.2 μm or less, and still more preferably 0.8 μm or more and 1.1 μm or less.

The average thickness of the resin layer can be controlled by an amount of the resin used for forming the resin layer, and the average thickness of the resin layer increases as the amount of the resin with respect to the amount of the magnetic particle increases.

In the present exemplary embodiment, the average particle diameter of the inorganic particles contained in the resin layer and the average thickness of the resin layer are determined by the following methods.

The carrier is embedded in an epoxy resin and cut with a microtome to prepare a carrier cross section. A scanning electron microscope (SEM) image obtained by capturing the carrier cross section with the SEM is taken into an image processing analysis apparatus for image analysis. 100 inorganic particles (primary particles) in the resin layer are randomly selected, and an equivalent circular diameter (nm) of each particle is calculated and arithmetically averaged to obtain the average particle diameter (nm) of the inorganic particles. The thickness (μm) of the resin layer is measured by randomly selecting 10 points per particle of the carrier, and 100 particles of the carrier are further selected to measure thicknesses thereof, and all the thicknesses are arithmetically averaged to obtain the average thickness (μm) of the resin layer.

The resin layer of the carrier preferably contains the silica particles, and a silicon element concentration at the carrier surface determined by an X-ray photoelectron spectroscopy is more than 2 atomic % and less than 20 atomic %.

When the silicon element concentration is more than 2 atomic %, it means that the silica particles are appropriately distributed at the resin layer surface. Therefore, the chargeability of the carrier surface is appropriately lowered.

When the silicon element concentration is less than 20 atomic %, it means that an amount of silica particles distributed at the resin layer surface is not too large. Therefore, the chargeability of the carrier surface is not excessively lowered.

In either case, as a result, it is presumed that the toner is appropriately triboelectrically charged and the occurrence of fogging is prevented.

From the viewpoint described above, the silicon element concentration is more preferably more than 5 atomic % and less than 20 atomic %, and still more preferably more than 6 atomic % and less than 19 atomic %.

The silicon element concentration at the carrier surface can be controlled by the amount of the silica particles used for forming the resin layer, and the silicon element concentration at the carrier surface increases as the amount of the silica particles with respect to the amount of the resin increases.

The silicon element concentration (atomic %) of the carrier surface is determined based on a peak intensity of each element by analyzing the carrier as a sample by the X-ray photoelectron spectroscopy (XPS) under the following conditions.

XPS device: Versa Probe II manufactured by ULVAC-PHI, Inc.
Etching gun: argon gun
Acceleration voltage: 5 kV
Emission current: 20 mA
Spatter area: 2 mm×2 mm
Sputter rate: 3 nm/min (in terms of $SiO_2$)

A content of the inorganic particles contained in the resin layer is preferably 10 mass % or more and 60 mass % or less, more preferably 15 mass % or more and 55 mass % or less, and still more preferably 20 mass % or more and 50 mass % or less with respect to a total mass of the resin layer.

A content of the silica particles contained in the resin layer is preferably 10 mass % or more and 60 mass % or less, more preferably 15 mass % or more and 55 mass % or less, and still more preferably 20 mass % or more and 50 mass % or less with respect to a total mass of the resin layer.

The resin layer may contain conductive particles for a purpose of controlling charging and resistance. Examples of the conductive particles include carbon black and conductive particles among the above-mentioned inorganic particles.

Examples of a method for forming the resin layer on surfaces of the magnetic particle include a wet production method and a dry production method. The wet production method is a production method using a solvent that dissolves or disperses the resin constituting the resin layer. On the other hand, the dry production method is a production method that does not use the above solvent.

Examples of the wet production method include an immersion method in which the magnetic particles are immersed in a resin liquid for forming the resin layer to be coated, a spray method in which a resin liquid for forming the resin layer is sprayed on the surfaces of the magnetic particles, a fluidized bed method in which a resin liquid for forming the resin layer is sprayed while the magnetic particles are in a state of being fluidized in a fluidized bed, and a kneader coater method in which the magnetic particles and a resin liquid for forming the resin layer are mixed in a kneader coater to remove a solvent. These production methods may be repeated or combined.

The resin liquid for forming the resin layer used in the wet production method is prepared by dissolving or dispersing a resin, inorganic particles, and other components in a solvent. The solvent is not particularly limited. For example, aromatic hydrocarbons such as toluene and xylene, ketones such as acetone and methyl ethyl ketone, and ethers such as tetrahydrofuran and dioxane may be used.

Examples of the dry production method include a method of forming the resin layer by heating a mixture of the magnetic particles and a resin for forming the resin layer in a dry state. Specifically, for example, the magnetic particles and the resin for forming the resin layer are mixed in a gas phase and heated and melted to form the resin layer.

The ratio B/A can be controlled by production conditions.

For example, in a production method in which the kneader coater method is repeated plural times (for example, twice) to form the resin layer stepwise, in a final kneader coater step, the ratio B/A is controlled by adjusting a mixing time between particles to be coated and a resin liquid for forming the resin layer. The longer the mixing time in the final kneader coater step, the smaller the ratio B/A tends to be.

Alternatively, for example, in a production method in which a liquid composition containing inorganic particles (a resin may or may not be contained) is applied, by a spray method, to the resin-coated carrier surface manufactured by the kneader coater method, the ratio B/A is controlled by adjusting the particle diameter and the content of the inorganic particles contained in the liquid composition or an amount of the liquid composition applied to the resin-coated carrier.

An exposed area ratio of the magnetic particle at the carrier surface is preferably 5% or more and 30% or less, more preferably 7% or more and 25% or less, and still more preferably 10% or more and 25% or less. The exposed area ratio of the magnetic particle in the carrier can be controlled by the amount of the resin used for forming the resin layer, and the exposed area ratio becomes smaller as the amount of the resin relative to the amount of the magnetic particle increases.

The exposed area ratio of the magnetic particle at the carrier surface is a value obtained by the following method.

A target carrier and magnetic particle obtained by removing the resin layer from the target carrier are prepared. Examples of a method for removing the resin layer from the carrier include a method of dissolving a resin component with an organic solvent to remove the resin layer and a method of removing the resin component by heating at about 800° C. to remove the resin layer. The carrier and the magnetic particle are used as measurement samples, and Fe concentrations (atomic %) at surfaces of the samples are quantified by XPS, and (Fe concentration of the carrier)/(Fe concentration of the magnetic particle)×100 is calculated and used as the exposed area ratio (%) of the magnetic particle.

A volume average particle diameter of the carrier is preferably 10 μm or more and 120 μm or less, more preferably 20 μm or more and 100 μm or less, and still more preferably 30 μm or more and 80 μm or less.

Here, the volume average particle diameter means a particle diameter D50v corresponding to the cumulative percentage of 50% in a volume-based particle size distribution from the side of the small diameter.

<Image Forming Apparatus and Image Forming Method>

An image forming apparatus according to the present exemplary embodiment includes: an image carrier; a charging unit that charges a surface of the image carrier; an electrostatic charge image forming unit that forms an electrostatic charge image on the surface of the charged image carrier; a developing unit that accommodates an electrostatic charge image developer and develops, by the electrostatic charge image developer, an electrostatic charge image formed on the surface of the image carrier as a toner image; a transfer unit that transfers the toner image formed on the surface of the image carrier to a surface of a recording medium; and a fixing unit that fixes the toner image transferred to the surface of the recording medium. As the electrostatic charge image developer, the electrostatic charge image developer according to the present exemplary embodiment is applied.

In the image forming apparatus according to the present exemplary embodiment, an image forming method (image forming method according to the present exemplary embodiment) including a charging step of charging a surface of an image carrier, an electrostatic charge image forming step of forming an electrostatic charge image on the charged surface of the image carrier, a developing step of developing, by the electrostatic charge image developer according to the present exemplary embodiment, the electrostatic charge image formed on the surface of the image carrier as a toner image, a transfer step of transferring the toner image formed on the surface of the image carrier to a surface of a recording medium, and a fixing step of fixing the toner image transferred to the surface of the recording medium is performed.

A known image forming apparatus such as a direct transfer type apparatus that directly transfers the toner image formed on the surface of the image carrier to the recording medium, an intermediate transfer type apparatus that primarily transfers the toner image formed on the surface of the image carrier to a surface of an intermediate transfer member, and secondarily transfers the toner image transferred to the surface of the intermediate transfer member to the surface of the recording medium, an apparatus provided with a cleaning unit that cleans the surface of the image carrier after the transfer of the toner image and before charging, and an apparatus provided with a discharging unit that discharges the surface of the image carrier by irradiation with discharging light after the transfer of the toner image and before the charging, is applied to the image forming apparatus according to the present exemplary embodiment.

When the image forming apparatus according to the present exemplary embodiment is an intermediate transfer type apparatus, the transfer unit includes, for example, an intermediate transfer member on which a toner image is transferred onto a surface thereof, a primary transfer unit that primarily transfers the toner image formed on the surface of the image carrier onto the surface of the intermediate transfer member, and a secondary transfer unit that secondarily transfers the toner image transferred on the surface of the intermediate transfer member onto the surface of the recording medium.

In the image forming apparatus according to the present exemplary embodiment, for example, a part including the developing unit may have a cartridge structure (process cartridge) attached to and detached from the image forming apparatus. As the process cartridge, for example, a process cartridge that accommodates the electrostatic charge image developer according to the present exemplary embodiment and provided with a developing unit is preferably used.

Hereinafter, an example of the image forming apparatus according to the present exemplary embodiment will be described, whereas the image forming apparatus is not limited thereto. In the following description, main parts illustrated in the drawings will be described, and description of other parts will be omitted.

FIG. 1 is a schematic configuration diagram illustrating the image forming apparatus according to the present exemplary embodiment.

The image forming apparatus illustrated in FIG. 1 includes first to fourth electrophotographic image forming units 10Y, 10M, 10C, and 10K (image forming units) that output images of respective colors of yellow (Y), magenta (M), cyan (C), and black (K) based on image data subjected to color separation. The image forming units (hereinafter may be simply referred to as "unit") 10Y, 10M, 10C, and 10K are arranged side by side at a predetermined distance from each other in a horizontal direction. The units 10Y, 10M, 10C, and 10K may be process cartridges that are attached to and detached from the image forming apparatus.

Above the units 10Y, 10M, 10C, and 10K, an intermediate transfer belt (an example of the intermediate transfer member) 20 extends through respective units. The intermediate transfer belt 20 is provided by being wound around a drive roller 22 and a support roller 24, and travels in a direction from the first unit 10Y to the fourth unit 10K. A force is applied to the support roller 24 in a direction away from the drive roller 22 by a spring or the like (not shown). Tension is applied to the intermediate transfer belt 20 wound around the drive roller 22 and the support roller 24. An intermediate transfer member cleaning device 30 is provided on a side surface of an image carrier of the intermediate transfer belt 20 so as to face the drive roller 22.

Yellow, magenta, cyan, and black toners contained in toner cartridges 8Y, 8M, 8C, and 8K are supplied to developing devices 4Y, 4M, 4C, and 4K (an example of the developing unit) of the units 10Y, 10M, 10C, and 10K, respectively.

Since the first to fourth units 10Y, 10M, 10C, and 10K have the same configuration and operation, here, the first unit 10Y, which is arranged on an upstream side in a travelling direction of the intermediate transfer belt and forms a yellow image, will be described as a representative. 1M, 1C, and 1K in the second to fourth units 10M, 10C, and 10K are photoconductors corresponding to a photoconductor 1Y in the first unit 10Y. 2M, 2C and 2K are charging rollers corresponding to a charging roller 2Y. 3M, 3C, and 3K are laser beams corresponding to a laser beam 3Y. 6M, 6C, and 6K are photoconductor cleaning devices corresponding to a photoconductor cleaning device 6Y.

The first unit 10Y includes the photoconductor 1Y that acts as an image carrier. Around the photoconductor 1Y, the following members are arranged in order: the charging roller (an example of the charging unit) 2Y that charges a surface of the photoconductor 1Y to a predetermined potential; an exposure device (an example of the electrostatic charge image forming unit) 3 that exposes the charged surface with the laser beam 3Y based on a color-separated image signal to form an electrostatic charge image; the developing device (an example of the developing unit) 4Y that supplies a charged toner to the electrostatic charge image to develop the electrostatic charge image; a primary transfer roller 5Y (an example of the primary transfer unit) that transfers the developed toner image onto the intermediate transfer belt 20; and the photoconductor cleaning device (an example of the cleaning unit) 6Y that removes the toner remaining on the surface of the photoconductor 1Y after the primary transfer.

The primary transfer roller 5Y is arranged on an inner side of the intermediate transfer belt 20 and is provided at a position facing the photoconductor 1Y. A bias power supply (not shown) that applies a primary transfer bias is connected to each of the primary transfer rollers 5Y, 5M, 5C, and 5K of respective units. Each bias power supply changes a value of the transfer bias applied to each primary transfer roller under the control of a controller (not shown).

Hereinafter, an operation of forming a yellow image in the first unit 10Y will be described.

First, prior to the operation, the surface of the photoconductor 1Y is charged to a potential of −600 V to −800 V by using the charging roller 2Y.

The photoconductor 1Y is formed by laminating a photoconductive layer on a conductive substrate (for example, having a volume resistivity of $1\times10^{-6}$ Ω·cm or less at 20° C.). The photoconductive layer usually has high resistance (resistance of general resin), but has a property that when irradiated with a laser beam, a specific resistance of the portion irradiated with the laser beam changes. Therefore, the charged surface of the photoconductor 1Y is irradiated with the laser beam 3Y from the exposure device 3 in accordance with yellow image data sent from the controller (not shown). Accordingly, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to flow charges charged on the surface of the photoconductor 1Y and by, on the other hand, leaving charges of a portion not irradiated with the laser beam 3Y.

The electrostatic charge image formed on the photoreceptor 1Y rotates to a predetermined developing position as the photoreceptor 1Y travels. Then, at the developing position, the electrostatic charge image on the photoconductor 1Y is developed and visualized as a toner image by the developing device 4Y.

In the developing device 4Y, for example, an electrostatic charge image developer containing at least a yellow toner and a carrier is accommodated. The yellow toner is triboelectrically charged by being stirred inside the developing device 4Y, and has charges of the same polarity (negative polarity) as the charges charged on the photoconductor 1Y and is held on a developer roller (an example of a developer holder). Then, when the surface of the photoconductor 1Y passes through the developing device 4Y, the yellow toner electrostatically adheres to a discharged latent image portion on the surface of the photoconductor 1Y, and the latent image is developed by the yellow toner. The photoreceptor 1Y on which the yellow toner image is formed continuously travels at a predetermined speed, and the toner image developed on the photoconductor 1Y is conveyed to a predetermined primary transfer position.

When the yellow toner image on the photoconductor 1Y is conveyed to the primary transfer position, a primary transfer bias is applied to the primary transfer roller 5Y, an electrostatic force from the photoconductor 1Y to the primary transfer roller 5Y acts on the toner image, and the toner image on the photoconductor 1Y is transferred onto the intermediate transfer belt 20. The transfer bias applied at this time has a polarity (+) opposite to the polarity (−) of the toner, and is controlled to, for example, +10 μA by the controller (not shown) in the first unit 10Y.

On the other hand, the toner remaining on the photoconductor 1Y is removed and collected by the photoconductor cleaning device 6Y.

The primary transfer biases applied to the primary transfer rollers 5M, 5C, and 5K of the second unit 10M and the subsequent units are also controlled in the same manner as in the first unit.

In this way, the intermediate transfer belt 20 to which the yellow toner image is transferred by the first unit 10Y is sequentially conveyed through the second to fourth units 10M, 10C, and 10K, and toner images of the respective colors are superimposed and transferred in a multiple manner.

The intermediate transfer belt 20 onto which the toner images of four colors are transferred in a multiple manner through the first to fourth units arrives at a secondary transfer unit including the intermediate transfer belt 20, the support roller 24 in contact with an inner surface of the intermediate transfer belt, and a secondary transfer roller (an example of a secondary transfer unit) 26 arranged on an image holding surface side of the intermediate transfer belt 20. On the other hand, a recording paper (an example of the recording medium) P is fed through a supply mechanism into a gap where the secondary transfer roller 26 and the intermediate transfer belt 20 are in contact with each other at a predetermined timing, and a secondary transfer bias is applied to the support roller 24. The transfer bias applied at this time has the same polarity (−) as the polarity (−) of the toner. An electrostatic force from the intermediate transfer belt 20 to the recording paper P acts on the toner image, and the toner image on the intermediate transfer belt 20 is transferred onto the recording paper P. The secondary transfer bias at this time is determined according to the resistance detected by a resistance detection unit (not shown) that detects the resistance of the secondary transfer unit, and is subjected to voltage control.

Thereafter, the recording paper P is sent to a pressure contact portion (nip portion) of a pair of fixing rollers in a fixing device 28 (an example of the fixing unit), and the toner image is fixed onto the recording paper P, thereby forming a fixed image.

Examples of the recording paper Ponto which the toner image is transferred include plain paper used in electrophotographic copiers and printers. As the recording medium, in addition to the recording paper P, an OHP sheet or the like may be used.

In order to further improve the smoothness of the image surface after fixing, the surface of the recording paper P is also preferably smooth. For example, coated paper obtained by coating the surface of the plain paper with a resin or the like, or art paper for printing is preferably used.

The recording paper P, on which the fixing of the color image is completed, is conveyed out toward a discharge unit, and a series of color image forming operations is completed.

<Process Cartridge>

The process cartridge according to the present exemplary embodiment includes a developing unit that accommodates the electrostatic charge image developer according to the present exemplary embodiment and develops, by the electrostatic charge image developer, the electrostatic charge image formed on the surface of the image carrier as the toner image, and is attached to and detached from the image forming apparatus.

The process cartridge according to the present exemplary embodiment is not limited to the above configuration and may be configured to include a developing unit and, if necessary, at least one selected from other units such as an image carrier, a charging unit, an electrostatic charge image forming unit, and a transfer unit.

Hereinafter, an example of the process cartridge according to the present exemplary embodiment will be illustrated, whereas the process cartridge is not limited thereto. In the following description, main parts illustrated in the drawings will be described, and description of other parts will be omitted.

Figure 2:
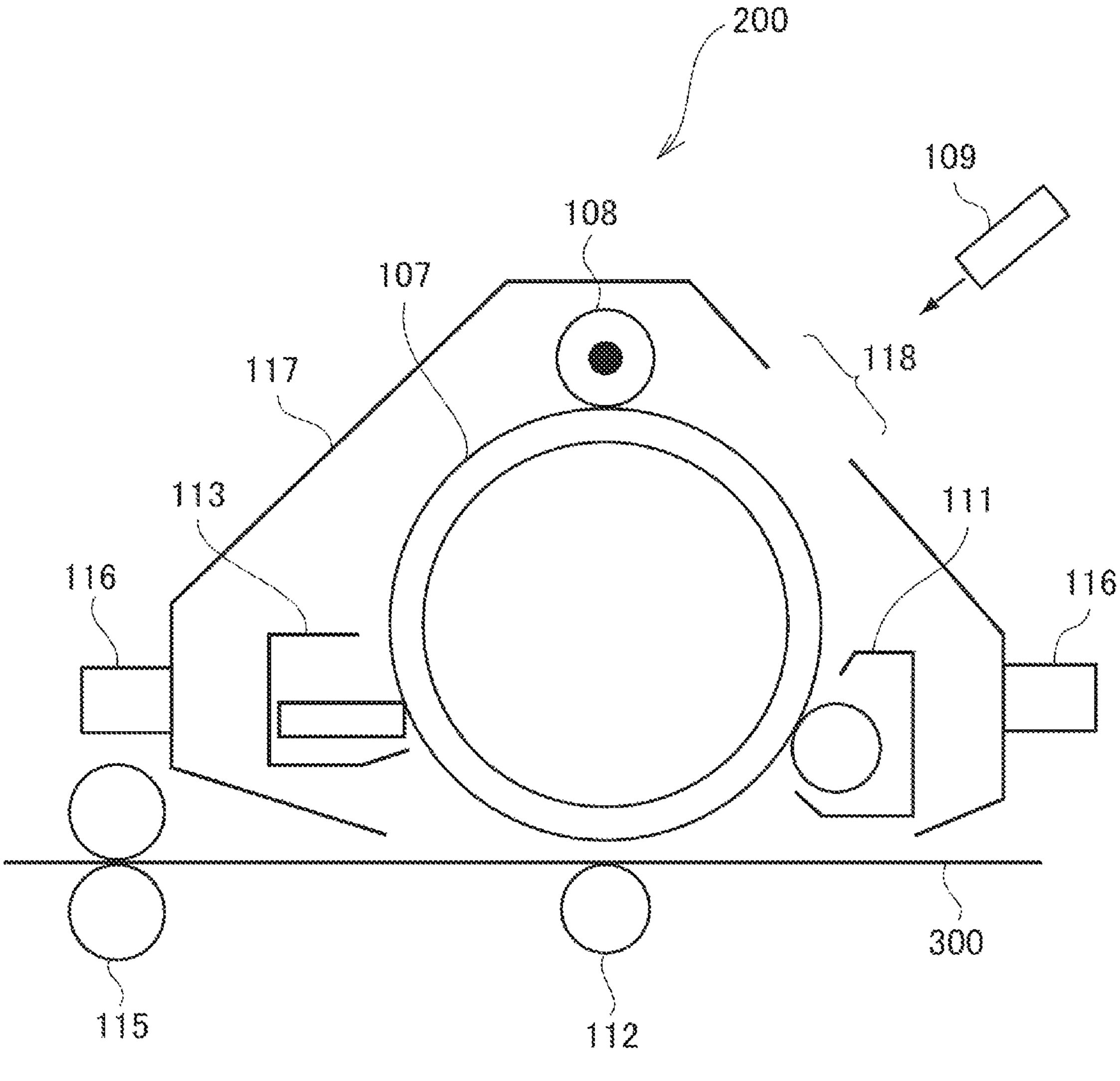
FIG. 2 is a schematic configuration diagram illustrating an example of a process cartridge attached to and detached from the image forming apparatus according to the present exemplary embodiment.

FIG. 2 is a schematic configuration diagram illustrating the process cartridge according to the present exemplary embodiment.

A process cartridge 200 illustrated in FIG. 2 is formed as a cartridge by, for example, integrally combining and holding a photoconductor 107 (an example of the image carrier), a charging roller 108 (an example of the charging unit), an image developing device 111 (an example of the developing unit), and a photoconductor cleaning device 113 (an example of a cleaning unit) provided around the photoconductor 107 by a housing 117 provided with a mounting rail 116 and an opening 118 for exposure.

In FIG. 2, 109 denotes an exposure device (an example of the electrostatic charge image forming unit), 112 denotes a transfer device (an example of the transfer unit), 115 denotes a fixing device (an example of the fixing unit), and 300 denotes recording paper (an example of the recording medium).

EXAMPLES

Hereinafter, the exemplary embodiment according to the invention will be described in detail with reference to Examples, whereas the exemplary embodiment according to the invention is not limited to these Examples.

In the following description, all "parts" and "%" are based on mass unless otherwise specified.

Synthesis, treatment, production, and the like are performed at a room temperature (25° C.±3° C.), unless otherwise specified.

<Preparation of Toner>

[Preparation of Amorphous Polyester Resin Dispersion Liquid (1)]

Terephthalic acid: 96 parts
Ethylene glycol: 37 parts
Neopentyl glycol: 65 parts
1,9-nonanediol: 32 parts The above materials are charged into a flask and raised to a temperature of 200° C. over 1 hour, and after confirming that the inside of the reaction system is uniformly stirred, 1.2 parts of dibutyltin oxide is added. The temperature is raised to 240° C. over 6 hours while water to be produced is distilled off, and stirring is continued at 240° C. for 4 hours to obtain an amorphous polyester resin (1) (weight average molecular weight 13,000, glass transition temperature 62° C.).

The amorphous polyester resin (1) is transferred to an emulsification disperser (CAVITRON CD1010 manufactured by Eurotech Co., Ltd.) at a rate of 100 g per minute while the amorphous polyester resin is in a molten state. Separately, dilute ammonia water having a concentration of 0.37% obtained by diluting reagent ammonia water with ion exchange water is put into a tank and transferred to the emulsification disperser at the same time as the amorphous polyester resin at a rate of 0.1 liter per minute while being heated to 120° C. in a heat exchanger. The emulsification disperser is operated under conditions of a rotation speed of 60 Hz and a pressure of 5 $kg/cm^2$ of a rotor to obtain an amorphous polyester resin dispersion liquid (1) having a volume average particle diameter of 160 nm and a solid content of 20%.

[Preparation of Crystalline Polyester Resin Dispersion Liquid (1)]

Dimethyl sebacate: 97 parts
Dimethyl isophthalate sodium 5-sulfonate: 3 parts
Ethylene glycol: 100 parts
Dibutyltin oxide (catalyst): 0.3 parts The above materials are put into a heated and dried three-necked flask, air in the three-necked flask is replaced with nitrogen gas to make an inert atmosphere, and stirring and refluxing are performed at 180° C. for 5 hours by mechanical stirring. Subsequently, the temperature is gradually increased to 240° C. under reduced pressure, the mixture is stirred for 2 hours, and when the mixture is in a viscous state, the mixture is air-cooled to stop the reaction, thereby obtaining a crystalline polyester resin (1) (weight average molecular weight: 9700, melting temperature: 84° C.).

90 parts of the crystalline polyester resin (1), 1.8 parts of an anionic surfactant (NEOGEN RK, manufactured by Daiichi Kogyo Seiyaku Co., Ltd.), and 210 parts of ion exchange water are mixed, heated to 100° C., dispersed using a homogenizer (ULTRA-TURRAX T50, manufactured by IKA), and then subjected to a dispersion treatment for 1 hour using a pressure discharge type Gaulin homogenizer to obtain a resin particle dispersion liquid in which resin particles having a volume average particle diameter of 180 nm are dispersed. Ion exchange water is added to the resin particle dispersion liquid to adjust a solid content to 20%, thereby obtaining the crystalline polyester resin dispersion (1).

[Preparation of Colorant Dispersion Liquid (C1)]

Cyan pigment (Pigment Blue 15:3, manufactured by Dainichiseika Color & Chemicals Mfg. Co., Ltd.): 50 parts
Anionic surfactant (NEOGEN RK manufactured by Daiichi Kogyo Seiyaku Co., Ltd.): 5 parts Ion-exchanged water: 195 parts The above materials are mixed and subjected to a dispersion treatment for 60 minutes using a high-pressure impact type disperser (ULTIMAIZER HJP30006 manufactured by Sugino Machine Limited) to obtain a colorant dispersion liquid (C1) having a solid content of 20%.

[Preparation of Mold Releasing Agent Dispersion Liquid (W1)]

Paraffin wax (HNP-9 manufactured by Nippon Seiro Co., Ltd., melting point: 75° C.): 100 parts Anionic surfactant (NEOGEN RK manufactured by Daiichi Kogyo Seiyaku Co., Ltd.): 1 part Ion-exchanged water: 350 parts The above materials are mixed and heated to 100° C., dispersed using the homogenizer (ULTRA-TURRAX T50 manufactured by IKA Co., Ltd.), and then subjected to a dispersion treatment with a pressure discharge type Gaulin homogenizer to obtain a mold releasing agent dispersion liquid in which mold releasing agent particles having a volume average particle diameter of 200 nm are dispersed. The ion-exchange water is added to the mold releasing agent dispersion liquid to prepare a solid content of 20%, thereby obtaining a mold releasing agent dispersion liquid (W1).

[Preparation of Cyan Toner Particles (1)]

Ion-exchanged water: 200 parts

Amorphous polyester resin dispersion liquid (1): 150 parts

Crystalline polyester resin dispersion liquid (1): 20 parts

Mold releasing agent dispersion liquid (W1): 10 parts

Colorant dispersion liquid (C1): 15 parts

Anionic surfactant (Tayca Power): 2.8 parts

The above materials are put into a round stainless steel flask, 0.1N nitric acid is added to adjust pH to 3.5, and then an aqueous solution of polyaluminum chloride in which 2 parts of polyaluminum chloride (30% powdery product manufactured by Oji Paper Co., Ltd.) is dissolved in 30 parts of ion-exchange water is added. The mixture is dispersed at 30° C. using the homogenizer (ULTRA-TURRAX T50 manufactured by IKA Co., Ltd.), the heated to 45° C. in an oil bath for heating, and held until the volume average particle diameter becomes 4.9 μm.

Next, 60 parts of the amorphous polyester resin dispersion liquid (1) are added and held for 30 minutes. Next, when the volume average particle diameter is 5.2 μm, 60 parts of the amorphous polyester resin dispersion liquid (1) are added and held for 30 minutes.

Next, 20 parts of 10% nitrilotriacetic acid (NTA) metal salt aqueous solution (CHELEST 70 manufactured by Chelest Corporation) is added, and a 1N sodium hydroxide aqueous solution is added to adjust the pH to 8.8. Next, 1 part of anionic surfactant (Tayca Power) is charged and heated to 96° C. while stirring is continued, and held for 6 hours. Next, the mixture is cooled to 20° C. at a rate of 20° C./min. Next, the solution is filtered, sufficiently washed with the ion-exchanged water, and dried to obtain cyan toner particles (1) having a volume average particle diameter of 5.7 μm.

[Preparation of Cyan Toner Particles (2) to (11)]

Cyan toner particles (2) to (11) are prepared in the same manner as in the preparation of the cyan toner particles (1), except that a pH and a temperature in a fusion and coalescence step or a usage amount of the crystalline polyester resin dispersion liquid (1) is changed as illustrated in Table 1.

[Preparation of Cyan Toners (1) to (11)]

100 parts of any of the cyan toner particles (1) to (11) and 1.5 parts of hydrophobic silica particles (RY50 manufactured by Nippon Aerosil Co., Ltd.) are charged into a sample mill and mixed at a rotation speed of 10,000 rpm for 30 seconds. Next, the mixture is sieved with a vibrating sieve having an opening of 45 μm to obtain cyan toners (1) to (11).

TABLE 1

| | | Usage amount of crystalline polyester resin dispersion liquid | Fusion and coalescence step | |
|---|---|---|---|---|
| Cyan toner | Cyan toner particles | (1) Part by mass | pH | Temperature ° C. |
| (2) | (2) | 20 | 8.6 | 98 |
| (3) | (3) | 20 | 8.7 | 97 |
| (1) | (1) | 20 | 8.8 | 96 |
| (4) | (4) | 20 | 9.0 | 95 |
| (5) | (5) | 20 | 9.2 | 94 |
| (6) | (6) | 20 | 9.4 | 92 |
| (7) | (7) | 20 | 9.6 | 90 |
| (8) | (8) | 10 | 8.8 | 96 |
| (9) | (9) | 15 | 8.8 | 96 |
| (10) | (10) | 23 | 8.8 | 96 |
| (11) | (11) | 25 | 8.8 | 96 |

[Preparation of Ferrite Particles]

1318 parts of $Fe_2O_3$, 587 parts of $Mn(OH)_2$, and 96 parts of $Mg(OH)_2$ are mixed and calcined at a temperature of 900° C. for 4 hours. A calcined product, 6.6 parts of polyvinyl alcohol, 0.5 parts of polycarboxylic acid as a dispersant, and zirconia beads having a medium diameter of 1 mm are charged into water, pulverized, and mixed in a sand mill to obtain a dispersion liquid. A volume average particle diameter of particles in the dispersion liquid is 1.5 μm.

The dispersion liquid is used as a raw material and granulated and dried with a spray dryer to obtain granules having a volume average particle diameter of 37 μm. Next, under an oxygen-nitrogen mixed atmosphere having an oxygen partial pressure of 1%, main firing is performed using an electric furnace at a temperature of 1450° C. for 4 hours, and then heating is performed in air at a temperature of 900° C. for 3 hours to obtain fired particles. The fired particles are crushed and classified to obtain ferrite particles (1) having a volume average particle diameter of 35 μm. An arithmetic average height Ra (JIS B0601: 2001) of a roughness curve of the ferrite particles (1) is 0.6 μm.

<Preparation of Silica Particles to be Added to Carrier Resin Layer>

[Silica Particles (1)]

Commercially available hydrophilic silica particles (fumed silica particles, without surface treatment, volume average particle diameter: 40 nm) are prepared as silica particles (1).

[Silica Particles (2)]

890 parts of methanol and 210 parts of 9.8% ammonia water are charged into a 1.5 L glass reaction vessel equipped with a stirrer, a dropping nozzle, and a thermometer and mixed to obtain an alkaline catalyst solution. After the alkaline catalyst solution is adjusted to 45° C., 550 parts of tetramethoxysilane and 140 parts of 7.6% ammonia water are simultaneously added dropwise over 450 minutes while stirring to obtain a silica particle dispersion liquid (A). The silica particles in the silica particle dispersion liquid (A) have a volume average particle diameter of 4 nm and a volume particle size distribution index of 1.2 (the volume particle size distribution index is $(D84v/D16v)^{1/2}$ which is square root of a ratio of a particle diameter D84v at 84% accumulation to a particle diameter D16v at 16% accumulation from the small diameter side in the volume-based particle size distribution).

300 parts of the silica particle dispersion liquid (A) are charged into an autoclave equipped with a stirrer, and the stirrer is rotated at a rotation speed of 100 rpm. While the stirrer is continuously rotated, liquefied carbon dioxide is injected into the autoclave from a carbon dioxide cylinder via a pump, a pressure inside the autoclave is raised by the pump while the temperature is raised by a heater, and the inside of the autoclave is brought into a supercritical state of 150° C. and 15 MPa. A pressure valve is operated to circulate supercritical carbon dioxide while keeping the inside of the autoclave at 15 MPa, and methanol and water are removed from the silica particle dispersion liquid (A). When an amount of carbon dioxide supplied into the autoclave reaches 900 parts, supply of carbon dioxide is stopped to obtain a powder of silica particles.

In a state in which the inside of the autoclave is maintained at 150° C. and 15 MPa by the heater and the pump to maintain the supercritical state of carbon dioxide, 50 parts of hexamethyldisilazane with respect to 100 parts of silica particles is injected into the autoclave by an entrainer pump while the stirrer of the autoclave is continuously rotated, the temperature inside the autoclave is raised to 180° C., and a reaction is carried out for 20 minutes. Next, the supercritical carbon dioxide is circulated again in the autoclave, and excess hexamethyldisilazane is removed. Next, stirring is stopped, the pressure valve is opened to release the pressure in the autoclave to atmospheric pressure, and the temperature is lowered to room temperature (25° C.). In this way, silica particles (2) surface-treated with the hexamethyldisilazane are obtained. The silica particles (2) have a volume average particle diameter of 4 nm.

[Silica Particles (3)]

In the same manner as the preparation of the silica particles (2), amounts of the tetramethoxysilane and the 7.6% ammonia water dropped when the silica particle dispersion liquid (A) is prepared are increased to change the volume average particle diameter of the silica particles in the silica particle dispersion liquid to 7 nm, thereby obtaining silica particles (3) surface-treated with the hexamethyldisilazane. The silica particles (3) have a volume average particle diameter of 7 nm.

[Silica Particles (4)]

Commercially available hydrophobic silica particles (fumed silica particles surface-treated with hexamethyldisilazane, volume average particle diameter: 12 nm) are prepared as silica particles (4).

[Silica Particles (5)]

Commercially available hydrophilic silica particles (fumed silica particles, without surface treatment, volume average particle diameter: 62 nm) are prepared as silica particles (5).

[Silica Particles (6)]

Commercially available hydrophobic silica particles (fumed silica particles surface-treated with hexamethyldisilazane, volume average particle diameter: 88 nm) are prepared as silica particles (6).

[Silica Particles (7)]

Commercially available hydrophobic silica particles (fumed silica particles surface-treated with hexamethyldisilazane, volume average particle diameter: 93 nm) are prepared as silica particles (7).

[Inorganic Particles (8)]

Commercially available calcium carbonate particles (volume average particle diameter: 20 nm) are prepared as inorganic particles (8).

[Inorganic Particles (9)]

Commercially available barium carbonate particles (volume average particle diameter: 40 nm) are prepared as inorganic particles (9).

[Inorganic Particles (10)]

Commercially available barium sulfate particles (BARIFINE BF-40, volume average particle diameter: 10 nm) are prepared as inorganic particles (10).

[Inorganic Particles (11)]

Commercially available barium sulfate particles (BARIFINE BF-20, volume average particle diameter: 30 nm) are prepared as inorganic particles (11).

[Inorganic Particles (12)]

Commercially available barium sulfate particles (BARIFINE BF-21, volume average particle diameter: 50 nm) are prepared as inorganic particles (12).

[Inorganic Particles (13)]

Commercially available barium sulfate particles (BARIFINE BF-10, volume average particle diameter: 60 nm) are prepared as inorganic particles (13).

<Preparation of Coating Agent for Forming Resin Layer of Carrier>

[Coating Agent (1)]

Cyclohexyl methacrylate resin (weight average molecular weight: 350,000): 6.6 parts
Perfluoropropylethyl methacrylate/methyl methacrylate copolymer (polymerization ratio by mass: 30:70, weight average molecular weight Mw=19000): 9.9 parts
Carbon black (Cabot Corporation, VXC72): 0.5 parts
Silica particles (1): 20 parts
Toluene: 250 parts
Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (1) having a solid content of 11%. The weight average molecular weight of the resin constituting the coating agent (1) is 150,000.

[Coating Agents (2) to (7)]

Coating agents (2) to (7) are obtained in the same manner as in preparation of the coating agent (1), except that the silica particles (1) are changed to any of the silica particles (2) to (7).

[Coating Agents (8) to (11)]

Coating agents (8) to (11) are obtained in the same manner as in the preparation of the coating agent (1), except that the addition amount of the silica particles (1) is changed as follows.

Coating agent (8): 10 parts of silica particles (1)
Coating agent (9): 12 parts of silica particles (1)
Coating agent (10): 30 parts of silica particles (1)
Coating agent (11): 40 parts of silica particles (1)

[Coating Agent (12-1)]

Cyclohexyl methacrylate resin (weight average molecular weight: 50,000): 20 parts
Polyisocyanate (Coronate L manufactured by Tosoh Corporation): 4 parts
Carbon black (Cabot Corporation, VXC72): 1 part
Toluene: 425 parts
Methanol: 50 parts The above materials and glass beads (diameter: 1 mm, the same amount as toluene) are charged into a sand mill and stirred at a rotation speed of 1,200 rpm for 30 minutes to obtain a coating agent (12-1) having a solid content of 5%.

[Coating Agent (12-2)]

Silica particles (4): 8 parts

Toluene: 92 parts

The above materials and glass beads (diameter: 1 mm, the same amount as toluene) are charged into a sand mill and stirred at a rotation speed of 1,200 rpm for 30 minutes to obtain a coating agent (12-2) having a solid content of 8%.

[Coating Agent (13)]

Cyclohexyl methacrylate resin (weight average molecular weight: 350,000): 3.3 parts Perfluoropropylethyl methacrylate/methyl methacrylate copolymer (polymerization ratio by mass: 30:70, weight average molecular weight Mw=19000): 13.2 parts Carbon black (Cabot Corporation, VXC72): 0.5 parts Silica particles (1): 20 parts Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (13) having a solid content of 11%. The weight average molecular weight of the resin constituting the coating agent (13) is 85,000.

[Coating Agent (14)]

Cyclohexyl methacrylate resin (weight average molecular weight: 350,000): 9.9 parts Perfluoropropylethyl methacrylate/methyl methacrylate copolymer (polymerization ratio by mass: 30:70, weight average molecular weight Mw=19000): 6.6 parts Carbon black (Cabot Corporation, VXC72): 0.5 parts Silica particles (1): 20 parts Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (14) having a solid content of 11%. The weight average molecular weight of the resin constituting the coating agent (14) is 210,000.

[Coating Agent (15)]

Cyclohexyl methacrylate resin (weight average molecular weight: 350,000): 16.5 parts Carbon black (Cabot Corporation, VXC72): 0.5 parts Silica particles (1): 20 parts Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (15) having a solid content of 11%.

[Coating Agent (16)]

Cyclohexyl methacrylate resin (weight average molecular weight: 350,000): 6.6 parts Perfluoropropylethyl methacrylate/methyl methacrylate copolymer (polymerization ratio by mass: 30:70, weight average molecular weight Mw=19000): 9.9 parts Carbon black (Cabot Corporation, VXC72): 0.5 parts Inorganic Particles (8): 20 parts Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (16) having a solid content of 11%.

[Coating Agent (17)]

Cyclohexyl methacrylate resin (weight average molecular weight: 350,000): 6.6 parts Perfluoropropylethyl methacrylate/methyl methacrylate copolymer (polymerization ratio by mass: 30:70, weight average molecular weight Mw=19000): 9.9 parts Carbon black (Cabot Corporation, VXC72): 0.5 parts Inorganic Particles (9): 20 parts Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (17) having a solid content of 11%.

[Coating Agent (18)]

Cyclohexyl methacrylate resin (weight average molecular weight: 350,000): 6.6 parts Perfluoropropylethyl methacrylate/methyl methacrylate copolymer (polymerization ratio by mass: 30:70, weight average molecular weight Mw=19000): 9.9 parts Carbon black (Cabot Corporation, VXC72): 0.5 parts Inorganic Particles (10): 20 parts Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (18) having a solid content of 11%.

[Coating Agent (19)]

Cyclohexyl methacrylate resin (weight average molecular weight: 350,000): 6.6 parts Perfluoropropylethyl methacrylate/methyl methacrylate copolymer (polymerization ratio by mass: 30:70, weight average molecular weight Mw=19000): 9.9 parts Carbon black (Cabot Corporation, VXC72): 0.5 parts Inorganic Particles (11): 20 parts Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (19) having a solid content of 11%.

[Coating Agent (20)]

Cyclohexyl methacrylate resin (weight average molecular weight: 350,000): 6.6 parts Perfluoropropylethyl methacrylate/methyl methacrylate copolymer (polymerization ratio by mass: 30:70, weight average molecular weight Mw=19000): 9.9 parts Carbon black (Cabot Corporation, VXC72): 0.5 parts Inorganic Particles (12): 20 parts Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (20) having a solid content of 11%.

[Coating Agent (21)]

Cyclohexyl methacrylate resin (weight average molecular weight: 350,000): 6.6 parts Perfluoropropylethyl methacrylate/methyl methacrylate copolymer (polymerization ratio by mass: 30:70, weight average molecular weight Mw=19000): 9.9 parts Carbon black (Cabot Corporation, VXC72): 0.5 parts Inorganic Particles (13): 20 parts Toluene: 250 parts Isopropyl alcohol: 50 parts The above materials and glass beads (diameter: 1 mm, the same amount as toluene) are charged into a sand mill and stirred at a rotation speed of 190 rpm for 30 minutes, to obtain a coating agent (21) having a solid content of 11%.

<Preparation of Resin-Coated Carrier>

[Carrier (1)]

1000 parts of the ferrite particles (1) and 125 parts of the coating agent (1) are charged into a kneader and mixed at a room temperature (25° C.) for 20 minutes. Then, the mixture is heated to 70° C. and reduced in pressure to be dried.

A dried product is cooled to the room temperature (25° C.), 125 parts of the coating agent (1) are additionally charged, and the mixture is mixed at the room temperature (25° C.) for 20 minutes. Then, the mixture is heated to 70° C. and reduced in pressure to be dried.

Next, a dried product is taken out from the kneader, and coarse powder is sieved with a mesh having an opening of 75 μm and removed to obtain the carrier (1).

[Carriers (2) to (7)]

Carriers (2) to (7) are obtained in the same manner as in the preparation of the carrier (1), except that the mixing time after the additional coating agent (1) is charged is changed as illustrated in Table 3.

[Carrier (8) to (13)]

Carriers (8) to (13) are obtained in the same manner as in the preparation of the carrier (1), except that the coating agent (1) is changed to any one of the coating agents (2) to (7).

[Carrier (14) to (19)]

Carriers (14) to (19) are obtained in the same manner as in the preparation of the carrier (1), except that the amount of the additionally charged coating agent (1) is changed as illustrated in Table 3.

[Carrier (20) to (23)]

Carriers (20) to (23) are obtained in the same manner as in the preparation of the carrier (1), except that the coating agent (1) is changed to any one of the coating agents (8) to (11).

[Carrier (24)]

100 parts of the ferrite particles (1) and 40 parts of the coating agent (12-1) are placed in a vacuum degassing kneader, heating and decompression are conducted with stirring, and the mixture is stirred and dried in an atmosphere of 90° C./−720 mmHg for 30 minutes. 10 parts of the coating agent (12-2) are applied to the taken-out carrier by a spray method, dried, and then allowed to stand at 150° C. for 1 hour in an electric furnace to be fired. The coarse powder is removed by sieving with a mesh having an opening of 75 μm to obtain the carrier (24).

[Carrier (25) to (33)]

Carriers (25) to (33) are obtained in the same manner as in the preparation of the carrier (1), except that the coating agent (1) is changed to any one of the coating agents (13) to (21).

<Preparation of Developer>

As illustrated in Tables 2 and 3, any one of the cyan toners (1) to (11) and any one of the carriers (1) to (33) are combined, put into a V blender at a mixing ratio of toner: carrier=10:100 (mass ratio), and stirred for 20 minutes to obtain a cyan developer.

<Surface Property Index Value of Toner Particles>

The specific surface area measured value of the toner particles is obtained from a nitrogen adsorption amount by BET one-point method (equilibrium relative pressure: 0.3).

The toner particles are taken into the flow particle image analysis apparatus (FPIA-3000 manufactured by Sysmex Corporation), the toner particles are captured, subjected to the two-dimensional image processing, and the equivalent circle diameter is calculated from the projection area. A sum of the surface areas and a sum of the volumes are calculated from equivalent circle diameters of 4,500 toner particles.

Density of the toner particles is measured by measuring true density in accordance with 8.2.2 of JIS K0061: 2001 using a Gulysack type specific gravity bottle.

<Dynamic Viscoelasticity Measurement of Toner>

Using a press molding machine, 0.25 g of toner is tablet-molded into a disk having a diameter of 8 mm and a thickness of 4 mm in an environment of 25° C.±3° C. The disk-shaped sample is placed on a parallel plate of a rheometer ("ARES" manufactured by TA Instruments Inc.). The sample is adhered to a parallel plate at a temperature of 130° C., cooled to a temperature of 30° C. at a cooling rate of 1° C./min, held at a temperature of 30° C. for 30 minutes, and then measured at the temperature of 30° C. Measurement conditions include a frequency of 1 Hz, an angular frequency of 6.28 rad/sec, and a strain of 0.03 to 20% (automatic control).

<Surface Analysis of Carrier>

As an apparatus for three-dimensional analysis of the surface of the carrier, an electron beam three-dimensional roughness analysis apparatus ERA-8900FE manufactured by Elionix Co., Ltd. is used. The surface analysis of the carrier by ERA-8900FE is specifically performed as follows.

The surface of one carrier particle is magnified 5,000 times, and three-dimensional measurement is performed by taking 400 measurement points in a long side direction and 300 points in a short side direction to obtain three-dimensional image data in a region of 24 μm×18 μm. For the three-dimensional image data, the limit wavelength of the spline filter is set to 12 μm to remove wavelengths having a period of 12 μm or more, and the cutoff value of the Gaussian high-pass filter is set to 2.0 μm to remove wavelengths having a period of 2.0 μm or more, so as to obtain three-dimensional roughness curve data. From three-dimensional roughness curve data, the surface area B ($\mu m^2$) of a central portion 12 μm×12 μm region (the plan view area A=144 $\mu m^2$) is obtained, so as to obtain the ratio B/A. The ratio B/A is calculated for each of 100 carriers and the arithmetic average value is obtained.

<Measurement of Average Particle Diameter of Silica Particles in Resin Layer>

The carrier is embedded in an epoxy resin and cut with a microtome to prepare a carrier cross section. An SEM image obtained by capturing the carrier cross section with a scanning transmission electron microscope (S-4100, manufactured by Hitachi, Ltd.) is taken into an image processing analysis apparatus (Nireco, Luzex AP), and image analysis is performed. 100 silica particles (primary particles) in the resin layer are randomly selected, and an equivalent circular diameter (nm) of each particle is calculated and arithmetically averaged to obtain the average particle diameter (nm) of the silica particles.

<Measurement of Average Thickness of Resin Layer>

The SEM image is taken into the image processing analysis apparatus (Nireco, Luzex AP) to perform the image analysis. The thickness (μm) of the resin layer is measured by randomly selecting 10 points per particle of the carrier, and 100 particles of the carrier are further selected to measure thicknesses thereof, and all the thicknesses are arithmetically averaged to obtain the average thickness (μm) of the resin layer.

<Measurement of Silicon Element Concentration>

The carrier is used as a sample and analyzed by X-ray photoelectron spectroscopy (XPS) under the following conditions, and the silicon element concentration (atomic %) is obtained from a peak intensity of each element.

XPS apparatus: VersaProbeII manufactured by ULVAC-PHI

Etching gun: argon gun, acceleration voltage: 5 k V

Emission current: 20 mA.

Sputtering region: 2 mm×2 mm

Sputtering rate: 3 nm/min (in terms of $SiO_2$)

<Evaluation of Fogging>

A modified machine of an image forming apparatus DocuPrint Color 3540 (manufactured by Fuji Xerox Co., Ltd.) is prepared, and a developer is put into a developing device. A toner of the same kind as the toner used for preparing the developer is put into the toner cartridge (for example, when the developer in the developing device is a developer in which the cyan toner (1) and the carrier (1) are combined, the cyan toner (1) is put into the toner cartridge).

The image forming apparatus is left in an environment at a temperature of 25° C. and a relative humidity of 55% for 24 hours. Under an environment of the temperature of 25° C. and the relative humidity of 55%, 50,000 sheets of cyan test images having an image density of 5% are output on A3 size paper. Next, 10 cyan test images with the image density of 40% are output on the entire surface of the A3 size paper, and the presence or absence of fogging is observed with naked eyes and a loupe with a magnification of 5 times, and classified as follows.

A: Fogging is not observed in all 10 sheets.

B: Fogging is slightly observed in one sheet by a loupe, but does not cause a problem.

C: Fogging is slightly observed in plural sheets by a loupe, but is slight, which is practically acceptable.

D: Fogging is observed in plural sheets by the naked eyes, but is slight, and is practically acceptable.

E: Fogging is observed in all 10 sheets by the naked eyes, which is not suitable for practical use.

TABLE 2

| | Cyan toner | | | Carrier | | | | | | | | |
|---|---|---|---|---|---|---|---|---|---|---|---|---|
| | | | | | Coating agent | | | Resin layer | | | | |
| | Number — | Surface property index value of Toner particles — | Storage elastic modulus G' × $10^8$ Pa | Number — | Number — | Additional charged amount Part by mass | Mixing time after additional charging min | Average particle diameter of inorganic particles nm | Average thickness μm | Ratio B/A — | Silicon element concentration atomic % | Fogging — |
| Example | (2) | 1.0 | 10 | (1) | (1) | 125 | 20 | 40 | 0.9 | 1.065 | 11.0 | D |
| Example | (3) | 1.2 | 10 | (1) | (1) | 125 | 20 | 40 | 0.9 | 1.065 | 11.0 | B |
| Example | (1) | 1.4 | 10 | (1) | (1) | 125 | 20 | 40 | 0.9 | 1.065 | 11.0 | A |
| Example | (4) | 1.6 | 10 | (1) | (1) | 125 | 20 | 40 | 0.9 | 1.065 | 11.0 | B |
| Example | (5) | 1.8 | 10 | (1) | (1) | 125 | 20 | 40 | 0.9 | 1.065 | 11.0 | C |
| Example | (6) | 1.9 | 10 | (1) | (1) | 125 | 20 | 40 | 0.9 | 1.065 | 11.0 | D |
| Comparative Example | (7) | 2.0 | 10 | (1) | (1) | 195 | 20 | 40 | 0.9 | 1.065 | 11.0 | E |
| Example | (8) | 1.4 | 15 | (1) | (1) | 195 | 20 | 40 | 0.9 | 1.065 | 11.0 | D |
| Example | (9) | 1.4 | 12 | (1) | (1) | 125 | 20 | 40 | 0.9 | 1.065 | 11.0 | C |
| Example | (10) | 1.4 | 8 | (1) | (1) | 125 | 20 | 40 | 0.9 | 1.065 | 11.0 | C |
| Example | (11) | 1.4 | 6 | (1) | (1) | 125 | 20 | 40 | 0.9 | 1.065 | 11.0 | D |

TABLE 3

| | Cyan toner | | | Carrier | | | | | | | | |
|---|---|---|---|---|---|---|---|---|---|---|---|---|
| | | | | | Coating agent | | | Resin layer | | | | |
| | Number — | Surface property index value of Toner particles — | Storage elastic modulus G' × $10^8$ Pa | Number — | Number — | Additional charged amount Part by mass | Mixing time after additional charging min | Average particle diameter of inorganic particles nm | Average thickness μm | Ratio B/A — | Silicon element concentration atomic % | Fogging — |
| Comparative Example | (1) | 1.4 | 10 | (2) | (1) | 125 | 40 | 40 | 1.0 | 1.019 | 10.1 | E |
| Example | (1) | 1.4 | 10 | (3) | (1) | 125 | 37 | 40 | 0.9 | 1.022 | 10.8 | D |
| Example | (1) | 1.4 | 10 | (4) | (1) | 125 | 30 | 40 | 1.2 | 1.043 | 10.2 | C |

TABLE 3-continued

| | Cyan toner | | | Carrier | | | | | | | | |
|---|---|---|---|---|---|---|---|---|---|---|---|---|
| | | | | | Coating agent | | | Resin layer | | | | |
| | Number — | Surface property index value of Toner particles — | Storage elastic modulus G' × $10^8$ Pa | Number — | Number — | Additional charged amount Part by mass | Mixing time after additional charging min | Average particle diameter of inorganic particles nm | Average thickness μm | Ratio B/A — | Silicon element concentration atomic % | Fogging — |
| Example | (1) | 1.4 | 10 | (5) | (1) | 125 | 16 | 40 | 1.0 | 1.077 | 12.0 | C |
| Example | (1) | 1.4 | 10 | (6) | (1) | 125 | 10 | 40 | 1.1 | 1.098 | 11.5 | D |
| Comparative Example | (1) | 1.4 | 10 | (7) | (1) | 125 | 5 | 40 | 1.1 | 1.103 | 10.9 | E |
| Example | (1) | 1.4 | 10 | (8) | (2) | 125 | 20 | 4 | 1.1 | 1.067 | 11.9 | D |
| Example | (1) | 1.4 | 10 | (9) | (3) | 125 | 20 | 7 | 0.8 | 1.055 | 11.1 | C |
| Example | (1) | 1.4 | 10 | (10) | (4) | 125 | 20 | 12 | 0.8 | 1.078 | 9.8 | B |
| Example | (1) | 1.4 | 10 | (11) | (5) | 125 | 20 | 62 | 1.3 | 1.056 | 10.8 | B |
| Example | (1) | 1.4 | 10 | (12) | (6) | 125 | 20 | 88 | 0.8 | 1.042 | 10.6 | C |
| Example | (1) | 1.4 | 10 | (13) | (7) | 125 | 20 | 93 | 0.7 | 1.059 | 10.0 | D |
| Example | (1) | 1.4 | 10 | (14) | (1) | 100 | 20 | 40 | 0.5 | 1.083 | 10.6 | D |
| Example | (1) | 1.4 | 10 | (15) | (1) | 110 | 20 | 40 | 0.7 | 1.058 | 11.3 | C |
| Example | (1) | 1.4 | 10 | (16) | (1) | 120 | 20 | 40 | 0.8 | 1.078 | 11.0 | B |
| Example | (1) | 1.4 | 10 | (17) | (1) | 130 | 20 | 40 | 1.0 | 1.083 | 10.2 | B |
| Example | (1) | 1.4 | 10 | (18) | (1) | 140 | 20 | 40 | 1.3 | 1.060 | 11.3 | C |
| Example | (1) | 1.4 | 10 | (19) | (1) | 150 | 20 | 40 | 1.5 | 1.054 | 12.1 | D |
| Example | (1) | 1.4 | 10 | (20) | (8) | 125 | 20 | 40 | 0.8 | 1.062 | 5.3 | D |
| Example | (1) | 1.4 | 10 | (21) | (9) | 125 | 20 | 40 | 1.1 | 1.084 | 6.5 | C |
| Example | (1) | 1.4 | 10 | (22) | (10) | 125 | 20 | 40 | 0.9 | 1.051 | 18.6 | C |
| Example | (1) | 1.4 | 10 | (23) | (11) | 125 | 20 | 40 | 1.0 | 1.069 | 19.7 | D |
| Example | (1) | 1.4 | 10 | (25) | (13) | 125 | 20 | 40 | 0.9 | 1.052 | 11.5 | C |
| Example | (1) | 1.4 | 10 | (26) | (14) | 125 | 20 | 40 | 0.9 | 1.071 | 12.5 | C |
| Example | (1) | 1.4 | 10 | (27) | (15) | 125 | 20 | 40 | 0.9 | 1.085 | 11.8 | D |
| Example | (1) | 1.4 | 10 | (28) | (16) | 125 | 20 | 20 | 0.9 | 1.061 | Not measured | C |
| Example | (1) | 1.4 | 10 | (29) | (17) | 125 | 20 | 40 | 0.9 | 1.063 | Not measured | C |
| Example | (1) | 1.4 | 10 | (30) | (18) | 125 | 20 | 10 | 0.9 | 1.067 | Not measured | C |
| Example | (1) | 1.4 | 10 | (31) | (19) | 125 | 20 | 30 | 0.9 | 1.072 | Not measured | C |
| Example | (1) | 1.4 | 10 | (32) | (20) | 125 | 20 | 50 | 0.9 | 1.086 | Not measured | D |
| Example | (1) | 1.4 | 10 | (33) | (21) | 125 | 20 | 60 | 0.9 | 1.092 | Not measured | D |
| Example | (1) | 1.4 | 10 | (24) | (12-1) (12-2) | Prepared by spray method | | 12 | 1.0 | 1.050 | 10.0 | C |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developer comprising:

a toner containing a toner particle and an external additive; and a carrier containing a magnetic particle and a resin layer covering the magnetic particle, wherein the toner particle has a surface property index value of 1.0 or more and less than 2.0, the carrier has a surface having a ratio B/A of a surface area B to a plane view area A of 1.020 or more and 1.100 or less, the plane view area A and the surface area B being obtained by three-dimensional analysis of the surface of the carrier, the resin layer contains inorganic particles having an average particle diameter of 4 nm or more and 93 nm or less, a content of the inorganic particles contained in the resin layer is 10 mass % or more and 60 mass % or less, and average thickness of the resin layer is 0.5 μm or more and 1.5 μm or less.

2. The electrostatic charge image developer according to claim 1, wherein the surface property index value is 1.2 or more and 1.8 or less.

3. The electrostatic charge image developer according to claim 1, wherein the ratio B/A is 1.040 or more and 1.080 or less.

4. The electrostatic charge image developer according to claim 2, wherein the ratio B/A is 1.040 or more and 1.080 or less.

5. The electrostatic charge image developer according to claim 1, wherein the resin layer comprises inorganic particles having an average particle diameter of 5 nm or more and 90 nm or less.

6. The electrostatic charge image developer according to claim 2, wherein the resin layer comprises inorganic particles having an average particle diameter of 5 nm or more and 90 nm or less.

7. The electrostatic charge image developer according to claim 3, wherein the resin layer comprises inorganic particles having an average particle diameter of 5 nm or more and 90 nm or less.

8. The electrostatic charge image developer according to claim 4, wherein the resin layer comprises inorganic particles having an average particle diameter of 5 nm or more and 90 nm or less.

9. The electrostatic charge image developer according to claim 5, wherein the average particle diameter of the inorganic particles is 5 nm or more and 70 nm or less.

10. The electrostatic charge image developer according to claim 6, wherein the average particle diameter of the inorganic particles is 5 nm or more and 70 nm or less.

11. The electrostatic charge image developer according to claim 7, wherein the average particle diameter of the inorganic particles is 5 nm or more and 70 nm or less.

12. The electrostatic charge image developer according to claim 1, wherein the resin layer has an average thickness of 0.6 μm or more and 1.4 μm or less.

13. The electrostatic charge image developer according to claim 12, wherein the average thickness of the resin layer is 0.8 μm or more and 1.2 μm or less.

14. The electrostatic charge image developer according to claim 1, wherein the toner has a storage elastic modulus G' of $6.0\times10^8$ Pa or more and $1.5\times10^9$ Pa or less at a temperature of 30° C. in dynamic viscoelasticity measurement.

15. The electrostatic charge image developer according to claim 14, wherein the storage elastic modulus G' is $8.0\times10^8$ Pa or more and $1.2\times10^9$ Pa or less.

16. The electrostatic charge image developer according to claim 1, wherein the resin layer comprises silica particles, and has a silicon element concentration of more than 2 atomic % and less than 20 atomic % at the surface of the carrier, the silicon element concentration being determined by X-ray photoelectron spectroscopy.

17. The electrostatic charge image developer according to claim 1, wherein the resin layer comprises a resin having a weight average molecular weight of less than 300,000.

18. A process cartridge configured to be attached to and detached from an image forming apparatus, the process cartridge comprising:

a developing unit that accommodates the electrostatic charge image developer according to claim 1, and is configured to develop an electrostatic charge image as a toner image by the electrostatic charge image developer, the electrostatic charge image being formed on a surface of an image carrier.

19. An image forming apparatus, comprising:

an image carrier;

a charging unit configured to charge a surface of the image carrier;

an electrostatic charge image forming unit configured to form an electrostatic charge image on the surface of the image carrier charged;

a developing unit that accommodates the electrostatic charge image developer according to claim 1, and is configured to develop the electrostatic charge image as a toner image by the electrostatic charge image developer;

a transfer unit configured to transfer the toner image formed on the surface of the image carrier to a surface of a recording medium; and a fixing unit configured to fix the toner image transferred to the surface of the recording medium.

20. An image forming method, comprising:

charging a surface of an image carrier;

forming an electrostatic charge image on the surface of the image carrier charged;

developing the electrostatic charge image as a toner image by the electrostatic charge image developer according to claim 1;

transferring the toner image formed on the surface of the image carrier to a surface of a recording medium; and fixing the toner image transferred to the surface of the recording medium.

* * * * *